(12) United States Patent
Rischar et al.

(10) Patent No.: US 9,958,860 B2
(45) Date of Patent: May 1, 2018

(54) SYSTEMS AND METHODS FOR BROADCASTING DATA AND DATA TAGS ASSOCIATED WITH AN INDUSTRIAL AUTOMATION SYSTEM

(71) Applicant: ROCKWELL AUTOMATION TECHNOLOGIES, INC., Milwaukee, WI (US)

(72) Inventors: Charles M. Rischar, Chardon, OH (US); William Sinner, Jackson, WI (US); Michael Kalan, Highland Heights, OH (US); Haithem Mansouri, Beachwood, OH (US); Subbian Govindaraj, Solon, OH (US); Juergen Weinhofer, Chagrin Falls, OH (US); Andrew R. Stump, Mentor, OH (US); Daniel S. DeYoung, Hudson, OH (US); Frank Kulaszewicz, Singapore (SG); Edward A. Hill, Chagrin Falls, OH (US); Keith Staninger, Aurora, OH (US); Matheus Bulho, Bainbridge Township, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 839 days.

(21) Appl. No.: 14/267,617

(22) Filed: May 1, 2014

(65) Prior Publication Data

US 2015/0316922 A1    Nov. 5, 2015

(51) Int. Cl.
*G05B 19/18* (2006.01)
*G05B 19/418* (2006.01)
(Continued)

(52) U.S. Cl.
CPC ... *G05B 19/41855* (2013.01); *G05B 19/0421* (2013.01); *G05B 19/4185* (2013.01);
(Continued)

(58) Field of Classification Search
CPC .................................................. G05B 19/41855
See application file for complete search history.

(56) References Cited

U.S. PATENT DOCUMENTS

| 6,684,121 B1 | 1/2004 | Lu et al. |
| 7,058,712 B1 | 6/2006 | Vasko et al. |

(Continued)

FOREIGN PATENT DOCUMENTS

| CN | 101939714 | 1/2011 |
| CN | 103500373 | 1/2014 |
| WO | 2013144594 A1 | 10/2013 |

OTHER PUBLICATIONS

EP Partial Search Report dated Oct. 7, 2015 for EP Application No. 15165609.7-1807.

*Primary Examiner* — Philip Wang
(74) *Attorney, Agent, or Firm* — Fletcher Yoder, P.C.

(57) ABSTRACT

An industrial control system may receive data associated with at least one component within an industrial automation system. The industrial control system may then determine whether the data is associated with at least one of a plurality of data tags, such that the at least one of the plurality of data tags describes at least one characteristic of the data. The industrial control system may then broadcast the data and the at least one of the plurality of data tags in a data feed channel when the data is associated with the at least one of the plurality of data tags.

14 Claims, 19 Drawing Sheets

(51) Int. Cl.
  *H04L 29/08* (2006.01)
  *G05B 19/042* (2006.01)
  *H04L 12/18* (2006.01)

(52) U.S. Cl.
  CPC .......... *H04L 12/1859* (2013.01); *H04L 67/10* (2013.01); *G05B 2219/25211* (2013.01); *G05B 2219/25232* (2013.01); *G05B 2219/33149* (2013.01); *G05B 2219/33333* (2013.01); *Y02P 80/114* (2015.11); *Y02P 90/18* (2015.11); *Y02P 90/86* (2015.11)

(56) References Cited

U.S. PATENT DOCUMENTS

| | | | |
|---|---|---|---|
| 7,526,794 B2 * | 4/2009 | Chand | G05B 19/054 700/108 |
| 7,996,093 B2 | 8/2011 | Govindaraj et al. | |
| 8,150,959 B1 * | 4/2012 | Bezdicek | G05B 23/027 709/224 |
| 8,200,591 B2 | 6/2012 | Govindaraj et al. | |
| 8,229,575 B2 | 7/2012 | Vasko et al. | |
| 8,606,928 B2 | 12/2013 | Vasko et al. | |
| 9,565,275 B2 * | 2/2017 | Lawson | G05B 19/4185 |
| 2006/0161597 A1 * | 7/2006 | Ougarov | G06F 17/30575 |
| 2009/0234468 A1 * | 9/2009 | Doi | G05B 19/0421 700/67 |
| 2009/0300021 A1 | 12/2009 | Vasko et al. | |
| 2010/0042586 A1 | 2/2010 | Vasko et al. | |
| 2010/0241755 A1 * | 9/2010 | Bassett | G06Q 10/06 709/229 |
| 2012/0310383 A1 * | 12/2012 | Karaffa | G05B 19/41865 700/80 |
| 2013/0110978 A1 * | 5/2013 | Gordon | H04N 21/2665 709/218 |
| 2014/0128994 A1 * | 5/2014 | Hallman | H04L 12/2827 700/12 |
| 2017/0186107 A1 * | 6/2017 | Golden | G06Q 50/06 |

* cited by examiner

SYSTEMS AND METHODS FOR BROADCASTING DATA AND DATA TAGS ASSOCIATED WITH AN INDUSTRIAL AUTOMATION SYSTEM

BACKGROUND

The present disclosure generally relates to enabling devices within an industrial automation system to become aware of certain attributes pertaining to the industrial automation system or a part of the industrial automation system, in which the devices are located. More specifically, the present disclosure relates to systems and methods for industrial automation devices to analyze its received data with respect to various parts of the industrial automation system or the industrial automation system as a whole.

BRIEF DESCRIPTION

In one embodiment, an industrial control system may receive data associated with at least one component within an industrial automation system. The industrial control system may then determine whether the data is associated with at least one of a plurality of data tags, such that the at least one of the plurality of data tags describes at least one characteristic of the data. The industrial control system may then broadcast the data and the at least one of the plurality of data tags in a data feed channel when the data is associated with the at least one of the plurality of data tags.

In another embodiment, a controller may receive a request to subscribe to a first data feed channel associated with the controller. Here, the request may be from at least one of a plurality of controllers. The controller may then determine whether the at least one of the plurality of controllers has an authorization to access the first data feed channel. The controller may then publish the first data feed channel in a second data feed channel associated with the at least one of the plurality of controllers when the at least one of the plurality of controllers has the authorization.

In yet another embodiment, a non-transitory computer-readable medium may include computer-executable instructions that may receive a request to display one or more entries of a data feed channel having one or more similar data tags, such that the data feed channel broadcasts a plurality of entries. Each of the plurality of entries may include data associated with an industrial automation component configured to send the data and at least one data tag configured to describe at least one characteristic of the data. The industrial automation component may be part of an industrial automation system. The non-transitory computer-readable medium may also query the data feed channel for the one or more entries of a data feed channel having one or more similar data tags. The non-transitory computer-readable medium may then display the one or more entries of a data feed channel having one or more similar data tags.

In yet another embodiment, a method may include receiving one or more entries of a data feed channel, such that the data feed channel broadcasts a plurality of entries. Each of the plurality of entries may include data associated with at least a first one of a plurality of industrial automation components that sends the data. The plurality of industrial automation components is part of an industrial automation system. Each of the plurality of entries may also include at least one data tag configured to describe at least one characteristic of the data. The method may then include performing one or more analyses the one or more entries to predict at least one property associated with at least a second one of the plurality of industrial automation components based on the data and the at least one data tag of the one or more entries. The method may then send one or more recommendations for adjusting one or more operations of the second one of the plurality of industrial automation components based on the analyses.

DRAWINGS

These and other features, aspects, and advantages of the present invention will become better understood when the following detailed description is read with reference to the accompanying drawings in which like characters represent like parts throughout the drawings, wherein.

Figure 1:
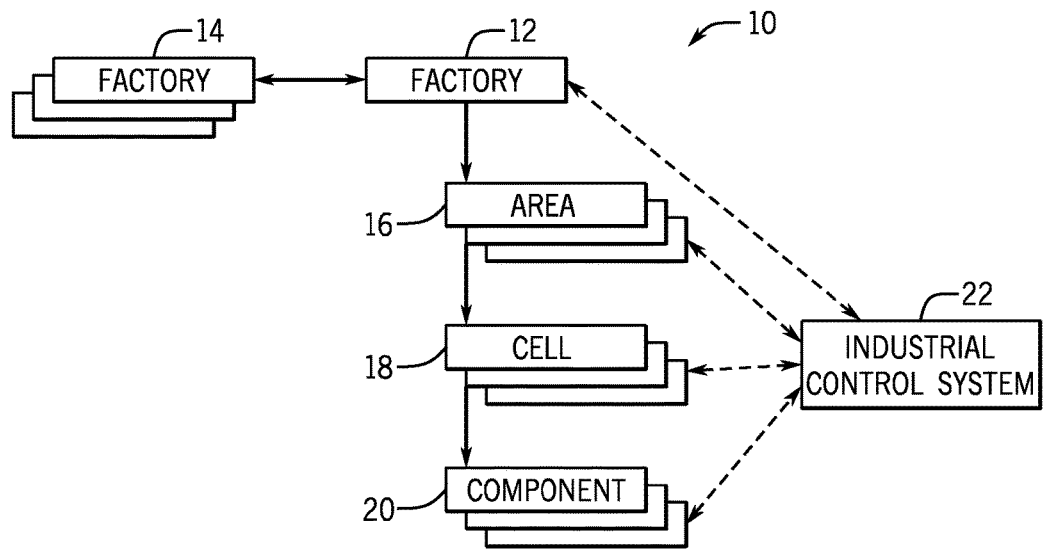
FIG. 1 illustrates a block diagram representing example hierarchical levels of an industrial automation system, in accordance with an embodiment presented herein.
Figure 4:
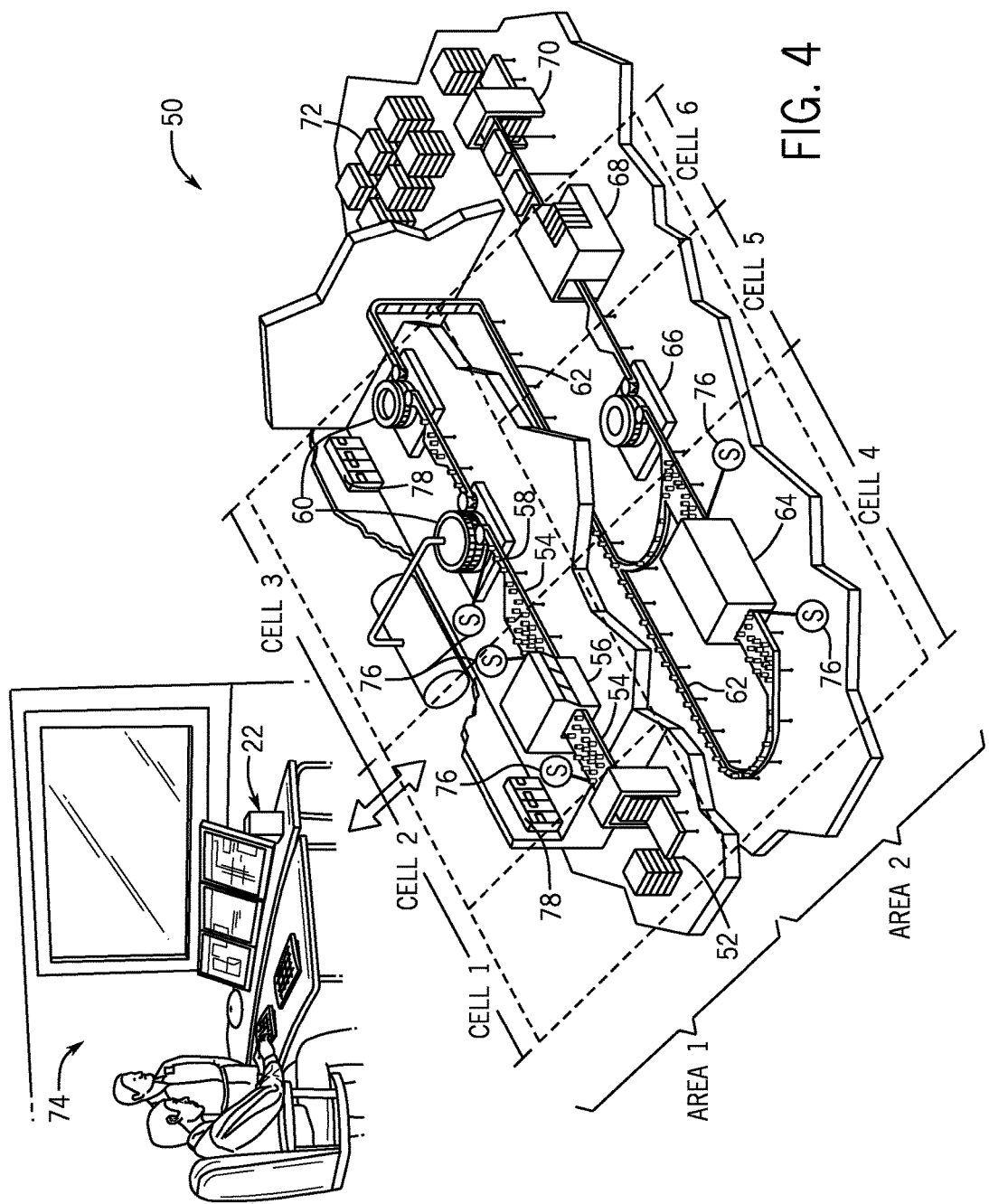
FIG. 4 illustrates an example of the industrial automation system of FIG. 1, in accordance with an embodiment presented herein.
Figure 12A:
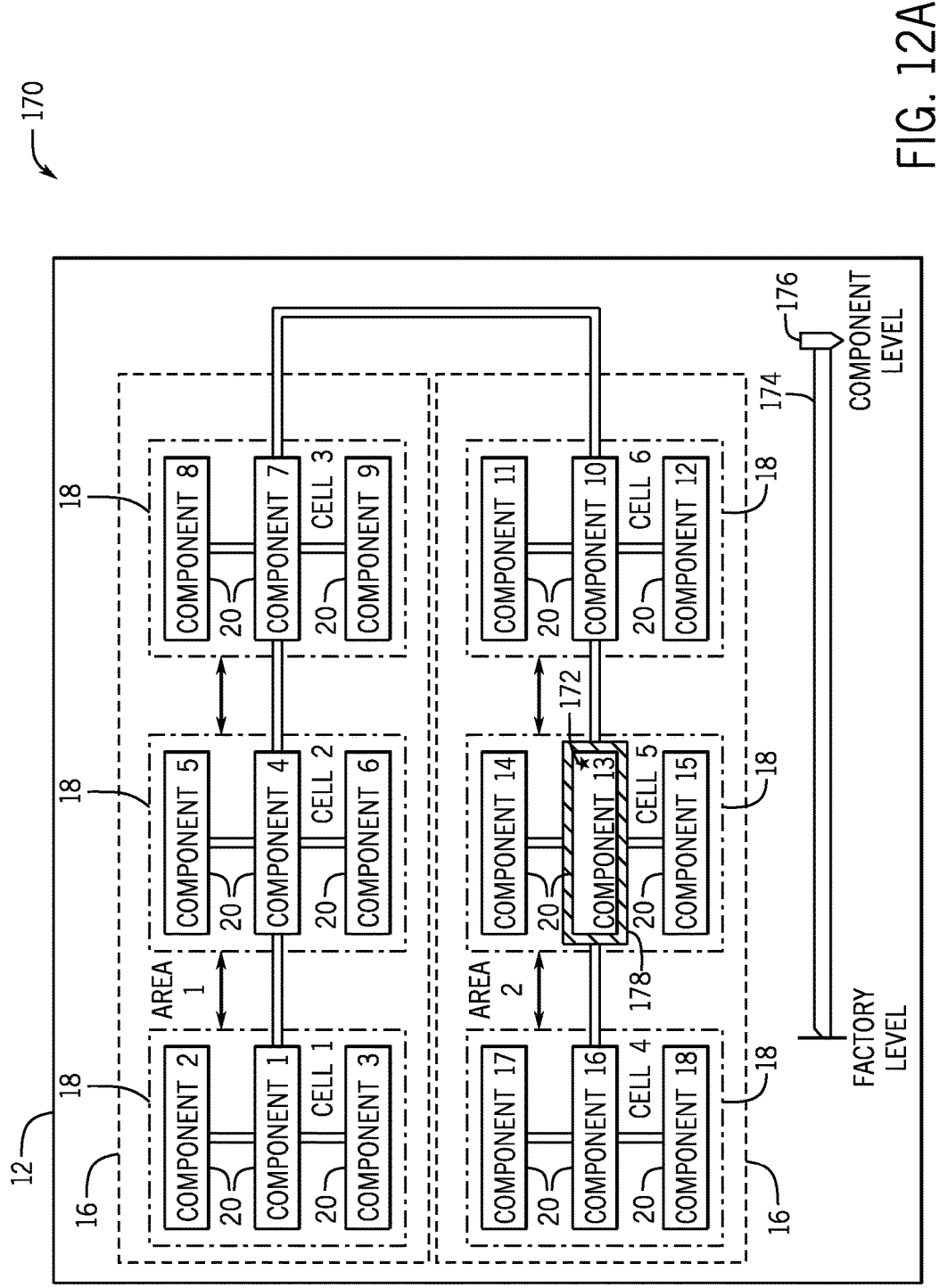
Figure 12B:
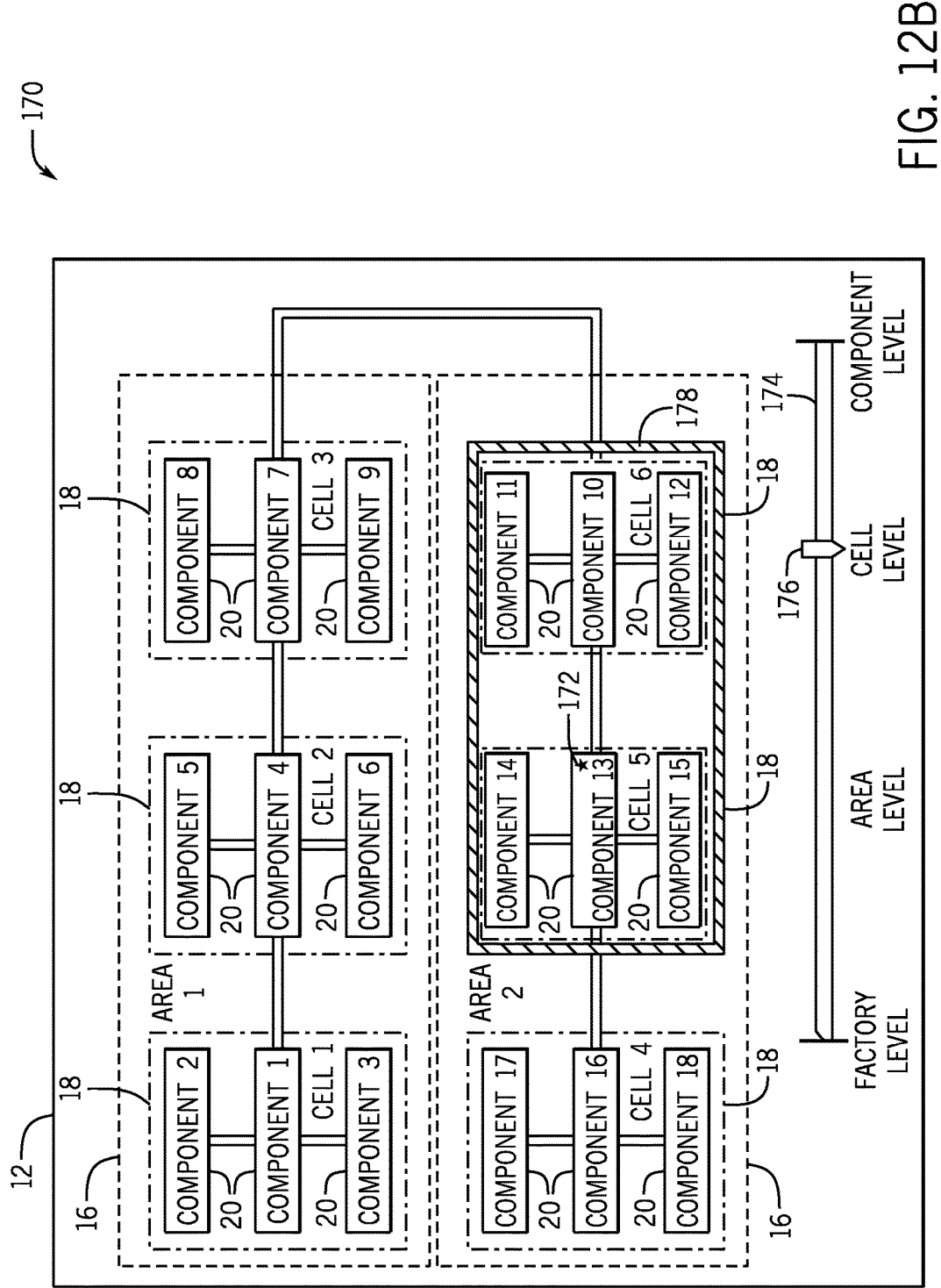
Figure 12C:
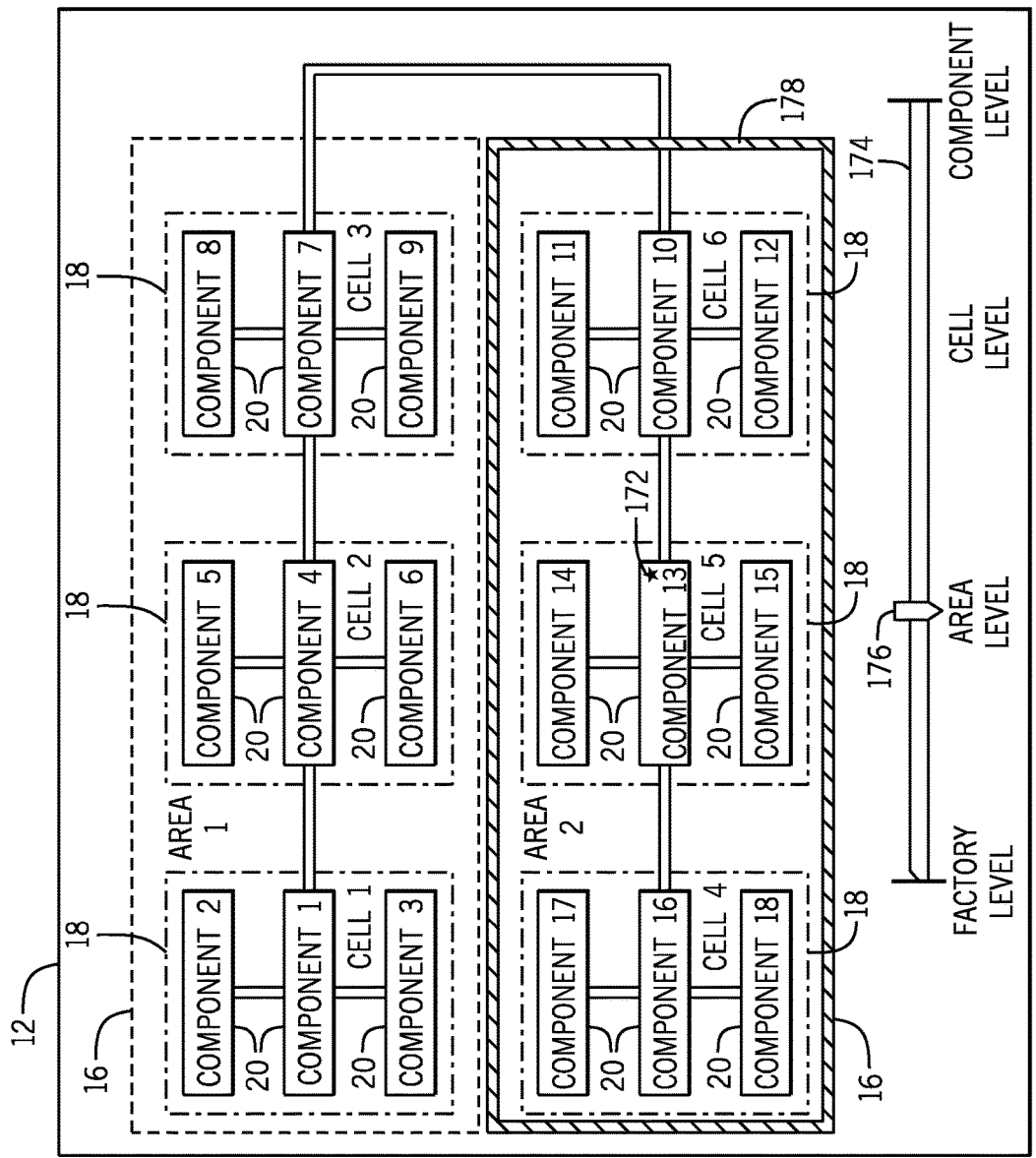
Figure 13:
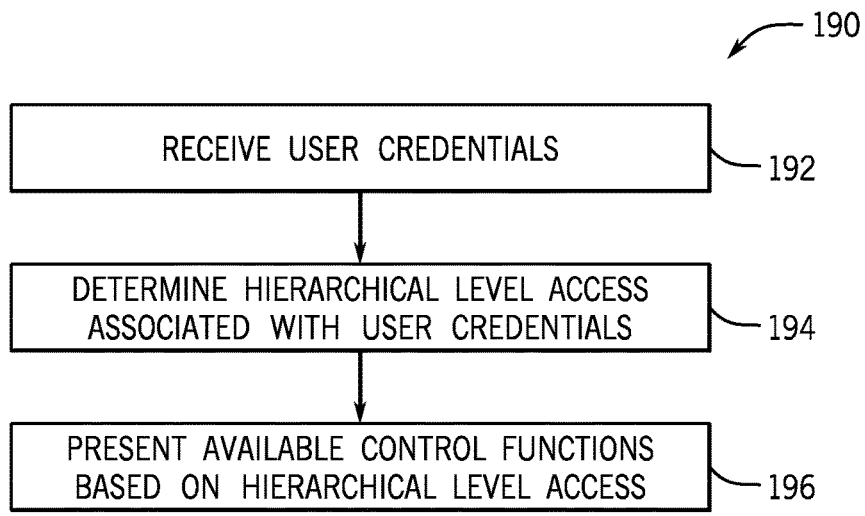
Figure 14:
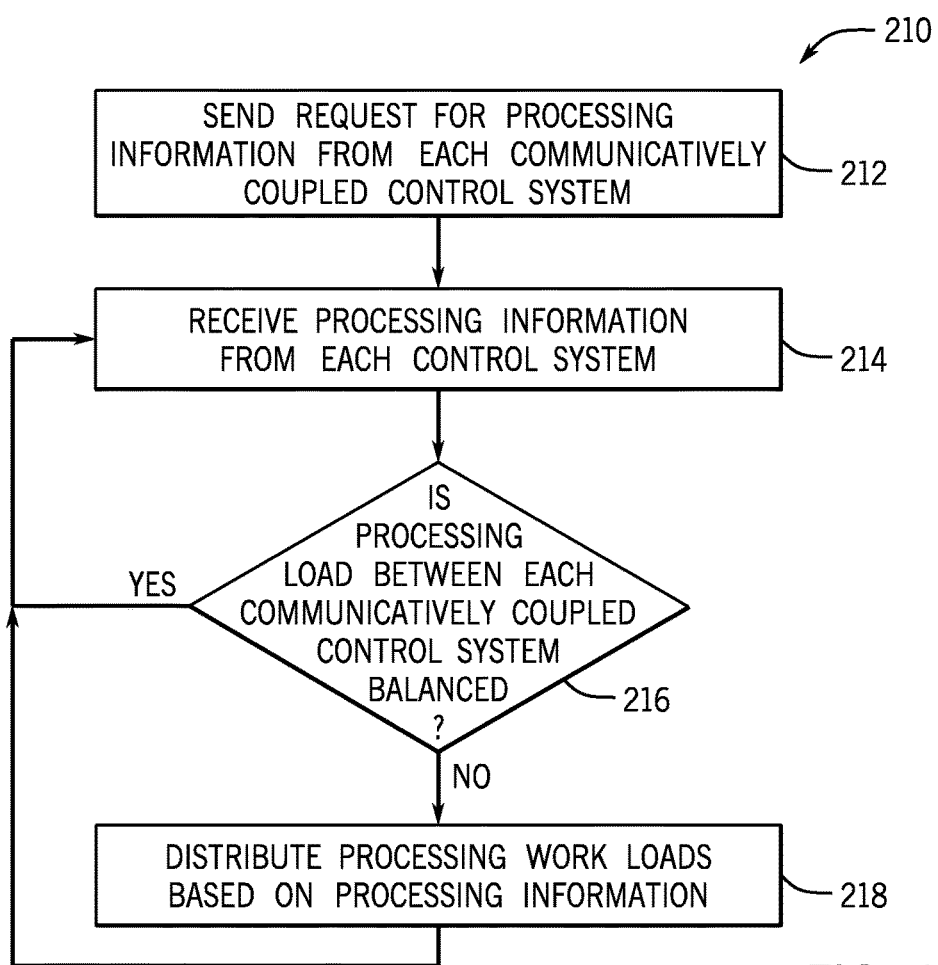
Figure 15:
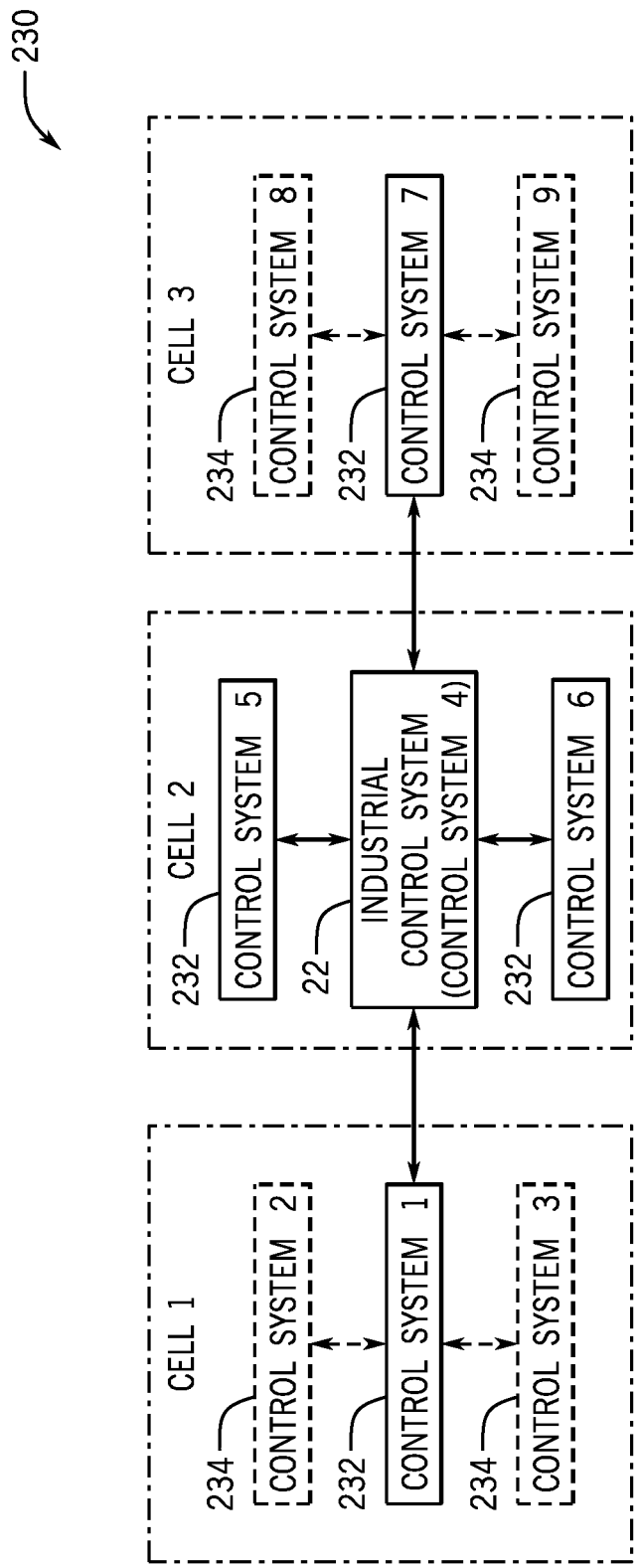
Figure 16:
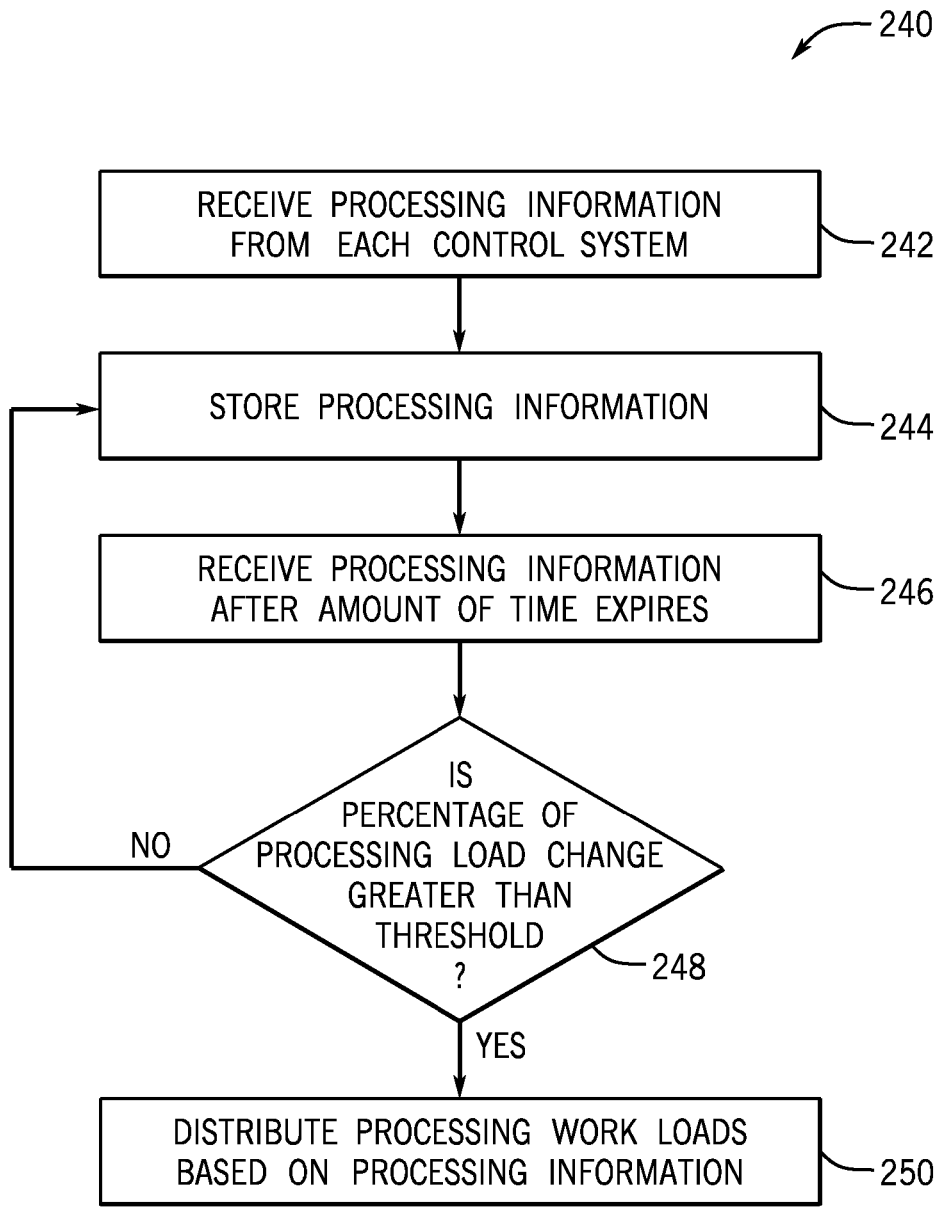
Figure 17:
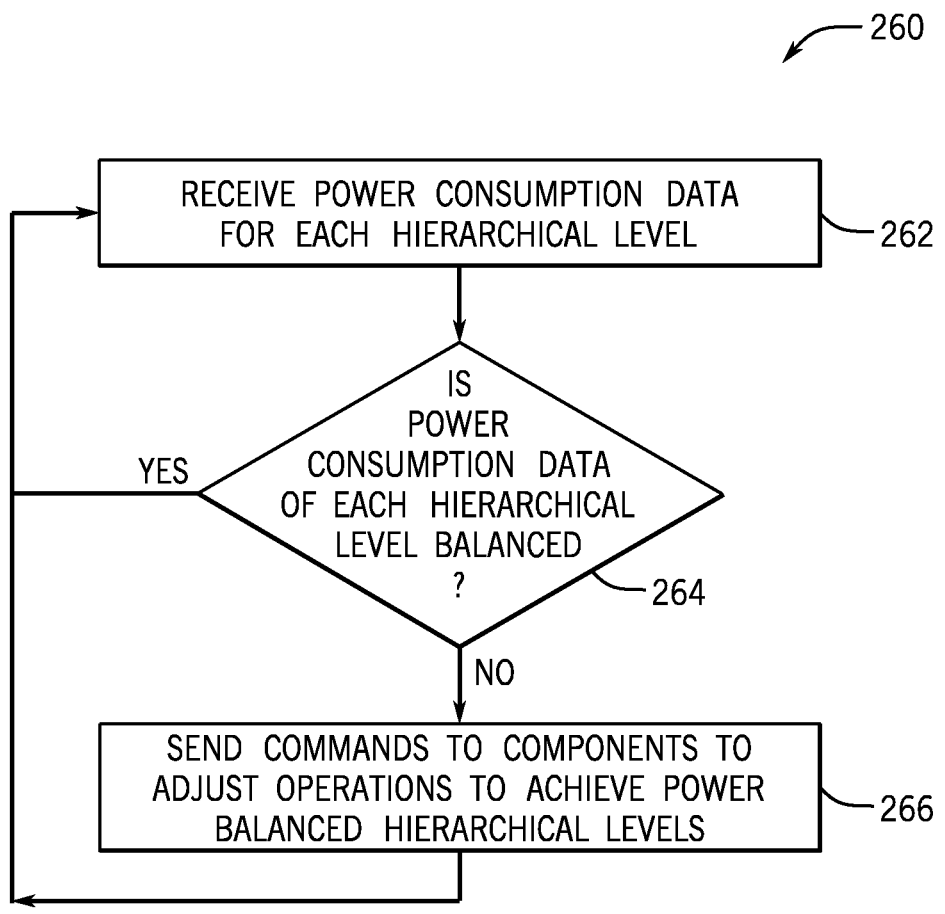
Figure 18:
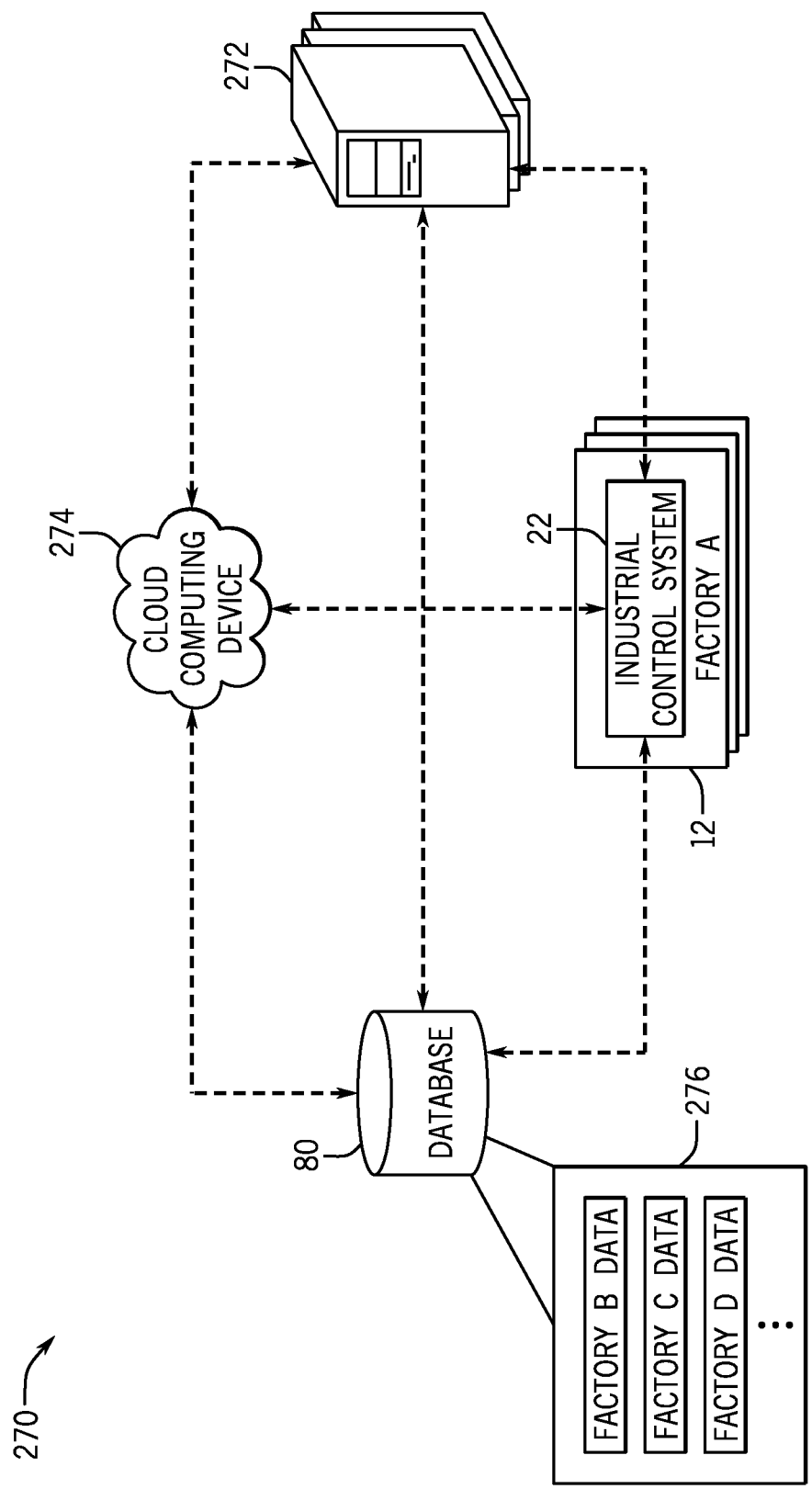
Figure 19:
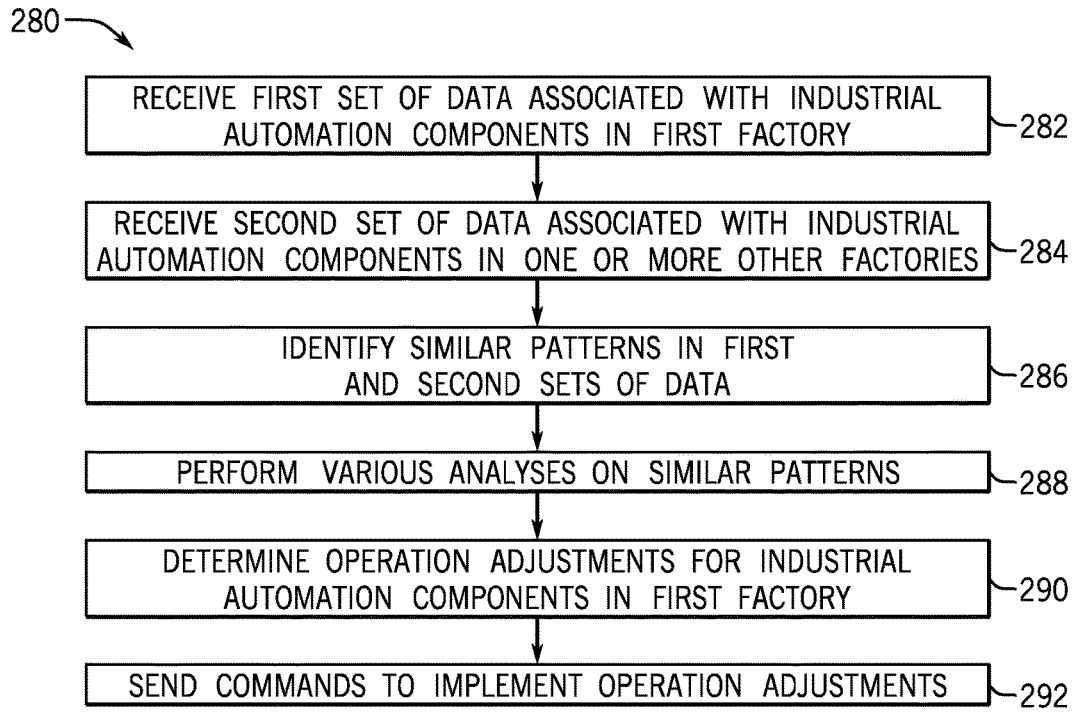
Figure 20:
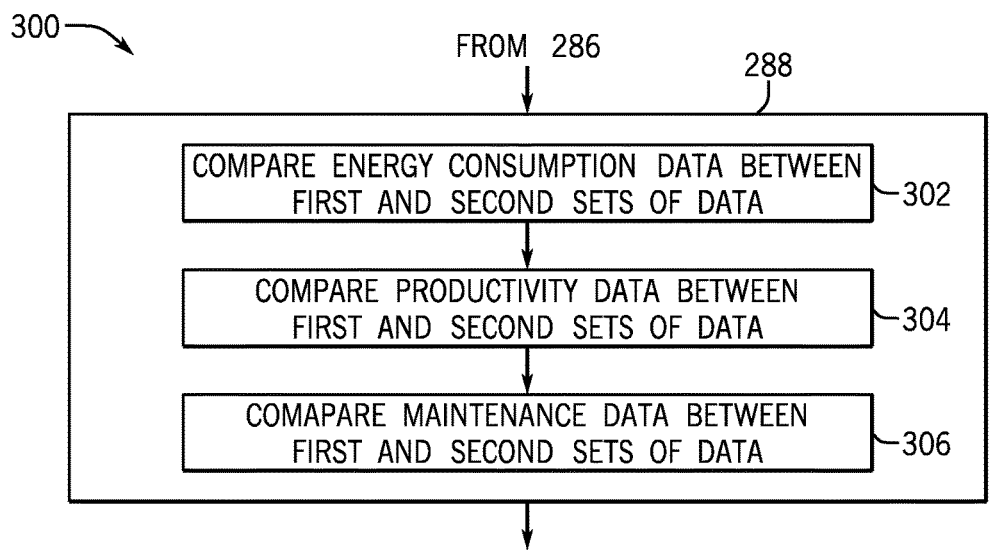
Figure 21:
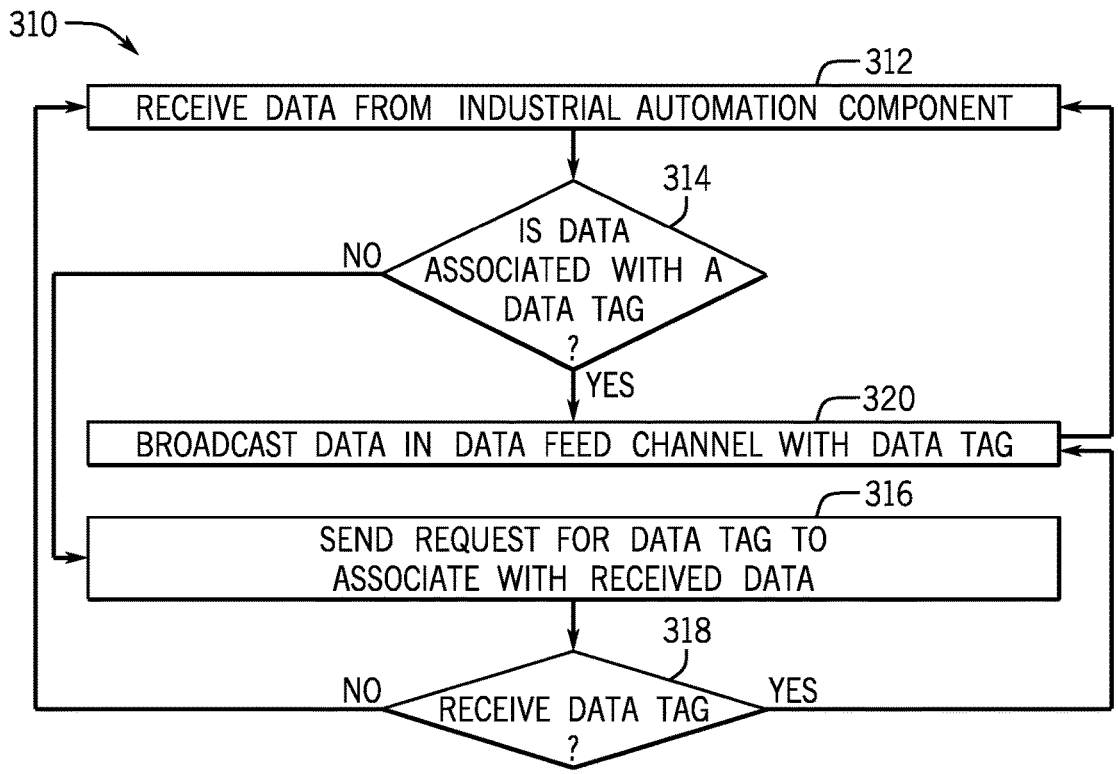
Figure 22:
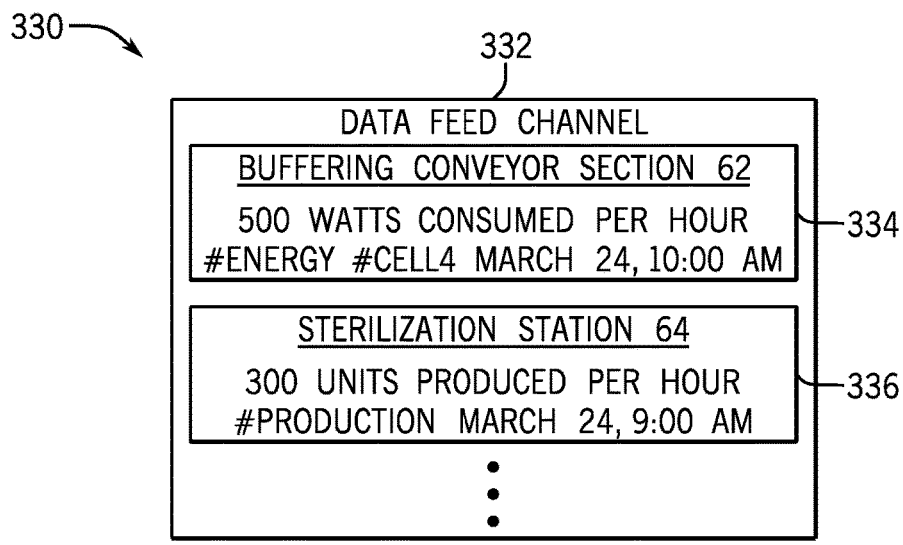
Figure 23:
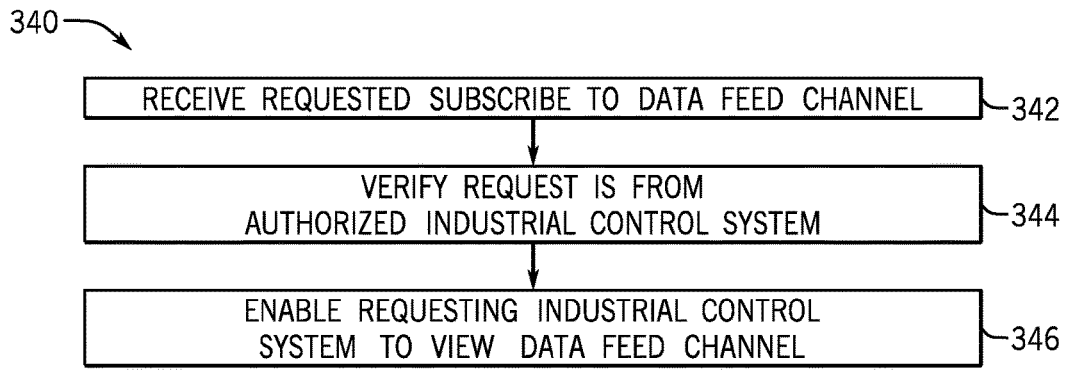
Figure 24:
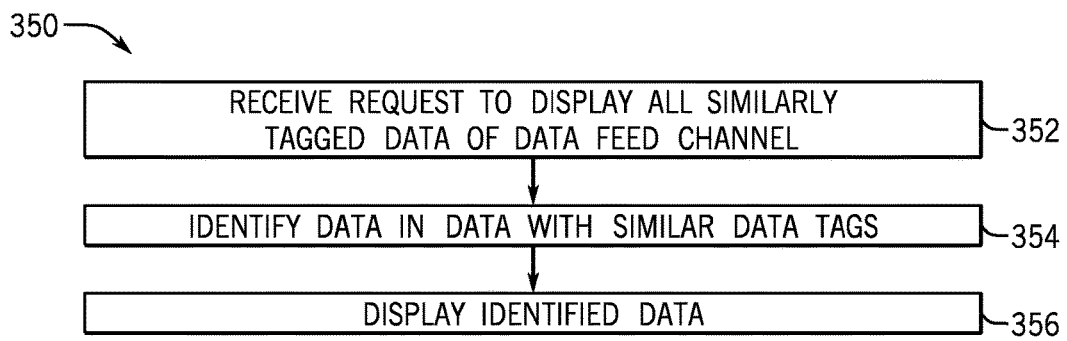
Figure 25:
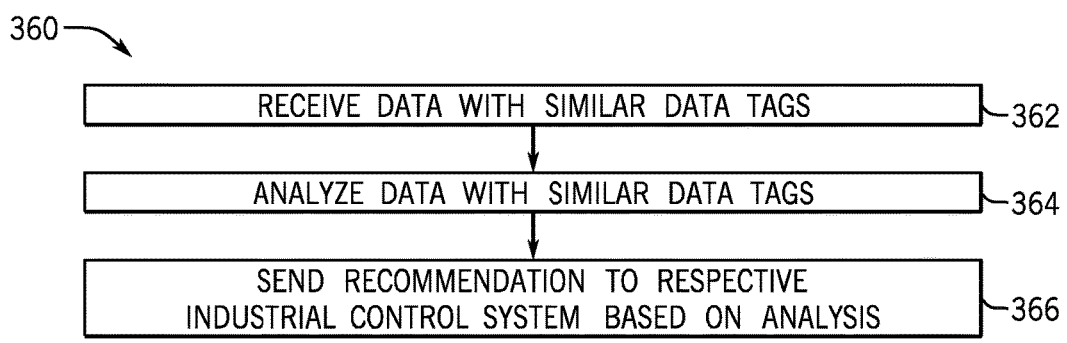

FIGS. 12A, 12B, and 12C illustrate block diagrams that depict different selections of a slider visualization that may be used to select a scope of hierarchical levels of the example industrial automation system of FIG. 4 that an industrial control system may be designated to have autonomous control over, in accordance with an embodiment presented herein;

FIG. 13 illustrates a flowchart of a method for modifying control functions of the industrial control system with respect to various hierarchical levels of the industrial automation system of FIG. 1 based on a user's credentials, in accordance with an embodiment presented herein;

FIG. 14 illustrates a flowchart of a method for balancing processing workloads of control systems in the industrial automation system of FIG. 1, in accordance with an embodiment presented herein;

FIG. 15 illustrates a block diagram of an example communication network available to a control system in the industrial automation system of FIG. 1, in accordance with an embodiment presented herein;

FIG. 16 illustrates a flow chart of a method for balancing processing workloads of control systems in the industrial automation system of FIG. 1 based on predicted workloads for the control systems, in accordance with an embodiment presented herein;

FIG. 17 illustrates a flow chart of a method for power balancing the operations of the industrial automation system of FIG. 1, in accordance with an embodiment presented herein;

FIG. 18 illustrates a block diagram of a data analysis system that may be employed in the industrial automation system of FIG. 1, in accordance with an embodiment presented herein;

FIG. 19 illustrates a flow chart of a method for controlling the operations of one or more components in the industrial automation system of FIG. 1 based on big data analysis, in accordance with an embodiment presented herein;

FIG. 20 illustrates a flow chart of a method for performing various types of analysis after similar patterns of data has been identified during the method for controlling operations of components of FIG. 19;

FIG. 21 illustrates a flow chart of a method for broadcasting data and data tags in the industrial automation system of FIG. 1, in accordance with an embodiment presented herein;

FIG. 22 illustrates an example block diagram of a data feed channel that output by the method of FIG. 21, in accordance with an embodiment presented herein;

FIG. 23 illustrates a flow chart of a method 330 for enabling a remote control system to subscribe to a data feed channel of a particular control system, in accordance with an embodiment presented herein;

FIG. 24 illustrates a flow chart of a method for organizing data published in a data feed channel, in accordance with an embodiment presented herein; and FIG. 25 illustrates a flow chart of a method for analyzing data published in a data feed channel in accordance with an embodiment presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards an industrial automation system that may employ a number of industrial automation components to perform various industrial processes. In one embodiment, each of the industrial automation components may be capable of connecting to an industrial automation network that may facilitate communication between each of the connected industrial automation components. The industrial automation network may include any wired or wireless network that may be implemented as a local area network (LAN), a wide area network (WAN), and the like. As such, an industrial automation component may include properties that enable the industrial automation component to be recognized once the industrial automation component is connected to the industrial automation network. Moreover, each industrial automation component already connected to the industrial automation system may be able to recognize other industrial automation components as they connect to the industrial automation network. By providing the ability to be recognized by industrial automation components and to recognize other industrial automation components, the devices and controllers employed in the industrial automation system that correspond to the connected industrial automation components may become aware of the industrial automation environment in which they exist. Using this awareness information, the devices and controllers may more efficiently control the operations of the industrial automation system by communicating with other industrial automation components and altering certain operations of the devices and controllers to maximize the efficiency of the energy used in the industrial automation system, the production of the industrial automation system, or any combination thereof.

In certain situations, once the industrial automation components recognize each other and begin communicating with each other via the industrial automation network, each industrial automation component may become aware of various attributes pertaining to other industrial automation components in the industrial automation system via the industrial automation network. As such, each industrial automation component may optimize their respective operations within the industrial automation system with respect to the attributes of the other industrial automation components. For example, an industrial automation component may receive data from other components that may be in a same or different part of the industrial automation system. The data may include system configurations for the other components, maintenance schedules for the other components, system design modifications for the other components, user preferences for the components, and any other data that may be stored in or acquired by the other components.

In one embodiment, after receiving the data from the other components, the respective industrial automation component may then contextualize the received data with respect to different scopes or hierarchical levels of the industrial automation system. That is, the respective industrial automation component may associate the received data to a scope or hierarchical level of the industrial automation system. By analyzing the received data with respect to the different scopes of the industrial automation system, the respective industrial automation component may adjust its operations and send commands to adjust the operations of other components to more effectively and efficiently control the operation of the overall industrial automation system. Moreover, the ability of the respective industrial automation component to contextualize data with respect to different scopes of the industrial automation system may improve a user experience in operating and maintaining an entire industrial automation system or various parts of the industrial automation system.

By way of introduction, FIG. 1 depicts a block diagram of an example of hierarchical levels that may represent an industrial automation system 10. The industrial automation system 10 may be any system in the material handling, packaging industries, manufacturing, processing, batch processing, or any technical field that employs the use of one or more industrial automation components. In one embodiment, the industrial automation system 10 may include a factory 12 that may encompass part of the entire industrial automation system 10. As such, the industrial automation system 10 may include additional factories 14 that may be employed with the factory 12 to perform an industrial automation process or the like.

Each factory 12 (or factory 14) may be divided into a number of areas 16, which may, for example, include different production processes that use different types of industrial automation components. In one example, one area 16 may include a sub-assembly production process and another area 16 may include a core production process. In another example, each area 16 may be related to a different operation being performed in the manufacturing process. For instance, in a jelly bean manufacturing system, the areas 16 may include a jelly bean making area, a packaging area, a water filtration area, and the like. In yet another example, the area may include a production line in which a particular industrial process may be performed. Referring back to the jelly bean manufacturing system example, the production line may include a cooking line in which the jelly beans may be created, a sorting line where the jelly beans may be sorted according to a respective flavor, and a packaging line where the sorted jelly beans may be packaged into boxes or the like.

The area 16 may also be associated with physical locations of a number of components 20 with respect to the industrial automation system 10. The areas 16 may also be related to different discipline areas of the industrial automation system 10, such as batch operation areas, continuous operation areas, discrete operation areas, inventory operation areas, and the like.

The areas 16 may be subdivided into smaller units, or cells 18, which may be further subdivided into components 20. Using the example described above, the sub-assembly production process area 16 may be subdivided into cells 18 that may denote a particular group of industrial automation components 20 that may be used to perform one aspect of the sub-assembly production process. As such, the cell 18 may include a portion of the area 16 such as first part of a production line. The cell 18 may also different parts of a particular procedure.

These cells 18 may then be further subdivided into components 20, which may correspond to individual industrial automation components, such as controllers, input/output (I/O) modules, motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. Although the factory 12, the factories 14, the areas 16, and the cells 18 are termed as factories, areas, and cells, it should be noted that in various industries these groupings may be referred to differently in different industries or the like. For instance, the groupings may be termed as units, areas, sites, and the like.

The components 20 may also be related to various industrial equipment such as mixers, machine conveyors, tanks, skids, specialized original equipment manufacturer machines, and the like. The components 20 may also be associated with devices used by the equipment such as scanners, gauges, valves, flow meters, and the like. In one embodiment, every aspect of the component 20 may be controlled or operated by a single controller (e.g., control system). In another embodiment, the control and operation of each aspect of the component 20 may be distributed via multiple controllers (e.g., control system).

The components 20 may be used within the corresponding cell 18, area 16, or factory 12 to perform various operations for the respective cell 18, area 16, or factory 12. In certain embodiments, the components 20 may be communicatively coupled to each other, to an industrial control system 22, or the like. Additionally, the industrial control system 22 may also be communicatively coupled to one or more control systems that may monitor and/or control the operations of each respective cell 18, area 16, or factory 12.

As such, the industrial control system 22 may be a computing device that may include communication abilities, processing abilities, and the like. For example, the industrial control system 22 may be a controller, such as a programmable logic controller (PLC), a programmable automation controller (PAC), or any other controller that may monitor, control, and operate an industrial automation device or component. The industrial control system 22 may be incorporated into any physical device (e.g., the industrial automation components 20) or may be implemented as a stand-alone computing device (e.g., general purpose computer), such as a desktop computer, a laptop computer, a tablet computer, a mobile device computing device, or the like.

In certain embodiments, the industrial control system 22 may be implemented within devices that enable industrial automation components 20 to connect and communicate with each other. For instance, the industrial control system 22 may be implemented within network routers and/or switches. In this manner, the network routers and/or switches may host the industrial control system 22 that may be used to control and operate the industrial control components 20 that may be communicatively coupled to the respective network router and/or switch. Since network routers and/or switches may serve as a hub for data transfers between the industrial automation components 20, the industrial control system 22 embedded within the routers/ and or switches may be strategically positioned within a data network to have access or receive data associated with various industrial automation components 20. As such, the industrial control system 22 may perform various types of analyses on the received data and may then control and operate the respective industrial automation components 20 more efficiently or effectively based on the results of the analyses.

In addition to the physical devices mentioned above, the industrial control system 22 may include a software-based emulation of any of the aforementioned physical devices. For example, the industrial control system 22 may be implemented as software modules that may perform similar operations as certain hardware controllers, devices, and the like. As such, the industrial control system 22 may create virtual instances of the hardware components (e.g., controllers, I/O modules). These virtual instances may provide more flexible ways in which the industrial control system 22 may be implemented to monitor and control the industrial automation components 20.

In one embodiment, the industrial control system 22 may be implemented virtually in a cloud-accessible platform (i.e., cloud-computing system), one or more servers, in various computing devices (e.g., general purpose computers), and the like. As such, the industrial control system 22 may operate as a soft controller or as a control engine running in the cloud-computing system. By virtually implementing the industrial control system 22 in a cloud-computing system, the industrial control system may use a distributed computing architecture to perform various analyses and control operations. As more data associated with the industrial automation components 20, the cells 18, the areas 16, and the factories 14 become available, the distributed computing architecture in the cloud-computing system may enable data analysis to be performed more efficiently. That is, since the cloud-computing system may incorporate numerous computing systems and processors to perform the data analysis, the results of the analysis may be available more quickly. In this way, the respective operations of the industrial automation components 20, the cells 18, the areas 16, and the factories 14 may be controlled in real-time or near real-time.

Keeping the foregoing in mind, it should be understood that the industrial control system 22, as mentioned throughout this disclosure, may be implemented as physical components and/or virtual components (i.e., software-based) used to monitor and/or operate the industrial automation components 20, the cells 18, the areas 16, and the factories 14. Moreover, by providing the ability to incorporate the industrial control system 22 into various types of environments, the industrial automation system 10 may be well suited to expand and grow with the addition of new industrial automation components 20.

Figure 2:
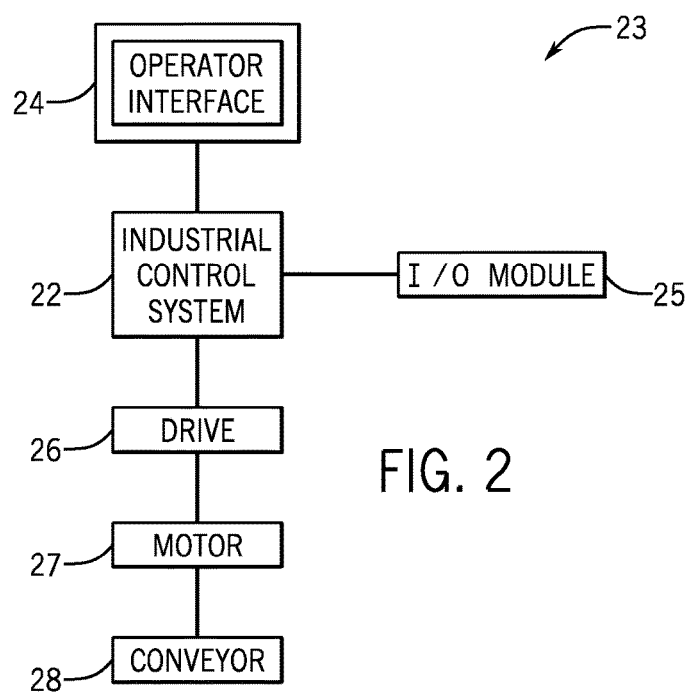
FIG. 2 illustrates a block diagram of an example control system that may be employed within the industrial automation system of FIG. 1, in accordance with an embodiment presented herein.

FIG. 2 illustrates an example control system 23 that may be employed with the industrial control system 22. As shown in FIG. 2, the industrial control system 22 may be communicatively coupled to an operator interface 24, which may be used to modify and/or view the settings and operations of the industrial control system 22. The operator interface 24 may be a user interface that may include a display and an input device used to communicate with the industrial control system 22. The display may be used to display various images generated by industrial control system 22, such as a graphical user interface (GUI) for operating the industrial control system 22. The display may be any suitable type of display, such as a liquid crystal display (LCD), plasma display, or an organic light emitting diode (OLED) display, for example. Additionally, in one embodiment, the display may be provided in conjunction with a touch-sensitive mechanism (e.g., a touch screen) that may function as part of a control interface for the industrial control system 22. In some embodiments, the operator interface 24 may be characterized as a human-machine interface, a human-interface machine, or the like.

The industrial control system 22 may also be communicatively coupled to input/output (I/O) modules 25. The I/O modules 25 may enable the industrial control system 22 to communicate with various devices in the industrial automation system. Moreover, the I/O modules 25 may enable the industrial control system 22 to receive information from the various devices, such that the information may provide reference points and other details regarding the industrial automation system to assist the industrial control system 22 to become aware of the environment in which the industrial control system 22 may be operating.

Generally, the industrial control system 22 may also be communicatively coupled to a certain device that may be used to control or manage the operation of the industrial automation system. For instance, in one embodiment, the industrial control system 22 may be coupled to a drive 26. The drive 26 may be an electrical drive that may convert an input alternating current (AC) voltage into a controllable AC voltage using a rectifier circuit and an inverter circuit. The industrial control system 22, in one embodiment, may be a controller that may control the operation of the drive 26. The drive 26 may be coupled to a motor 27, which may operate a component such as a conveyor 28 or the like. In one embodiment, the industrial control system 22 may be communicatively coupled to the operator interface 24, the I/O module 25, the drive 26, or the like via a communication network such as EtherNet/IP, ControlNet, DeviceNet, or any other industrial communication network protocol.

Keeping the example control system 23 in mind and referring to FIG. 1, the drive 26, the motor 27, and the conveyor 28 may each be considered to be a single component 20. However, the drive 26, the motor 27, and the conveyor 28 may also be considered to be a part of a particular cell 18, area 16, and factory 12. Accordingly, the industrial control system 22 may have the ability to adjust the operation of the component 20, the cell 18, the area 16, and the factory 12. For example, by adjusting the operation of the drive 26, the industrial control system 22 may adjust the operation of the motor 27 and the conveyor 28. Consequently, the industrial control system 22 may adjust the operation of the cell 18, the area 16, and the factory 12 having the conveyor 28 as a component. By understanding how each component 20 may be related to the industrial automation system 10 with respect to each area 16, each cell 18, and each component 20, the industrial control system 22 may begin to become capable to manage the operations (e.g., production, energy usage, equipment lifecycle) of the industrial automation system 10 more efficiently.

Figure 3:
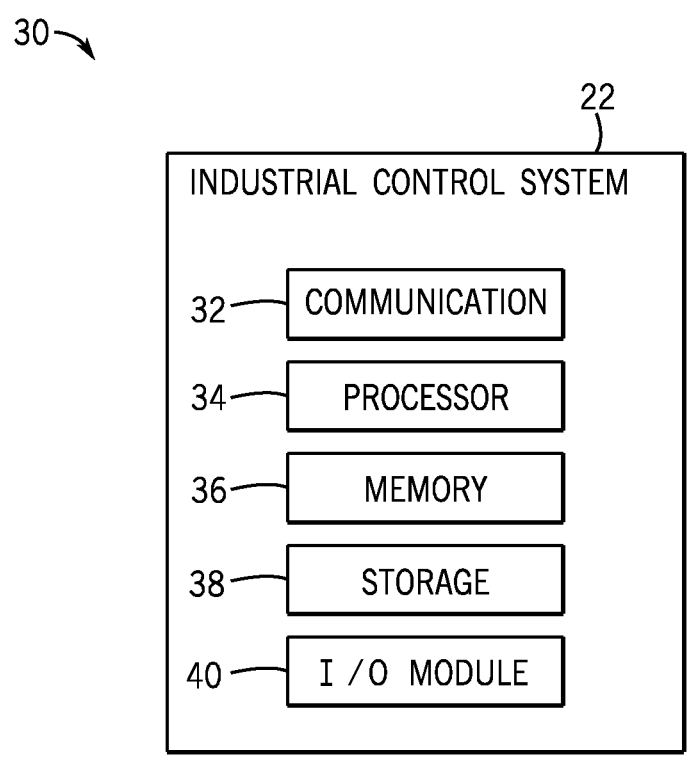
FIG. 3 illustrates a block diagram of components within the industrial control system of the industrial automation system of FIG. 1, in accordance with an embodiment presented herein.

As mentioned above, the industrial control system 22 may be a controller or any computing device that may include communication abilities, processing abilities, and the like. FIG. 3 illustrates a detailed block diagram 30 of components in the industrial control system 22 that may be used to perform the techniques described herein. Referring now to FIG. 3, the industrial control system 22 may include a communication component 32, a processor 34, a memory 36, a storage 38, input/output (I/O) ports 40, and the like. The communication component 32 may be a wireless or wired communication component that may facilitate communication between the industrial automation components 20, the control systems for the factory 12, the area 16, the cell 18, and the like. The processor 34 may be any type of computer processor or microprocessor capable of executing computer-executable code. The processor 34 may also include multiple processors that may perform the operations described below. The memory 36 and the storage 38 may be any suitable articles of manufacture that can serve as media to store processor-executable code, data, or the like. These articles of manufacture may represent computer-readable media (i.e., any suitable form of memory or storage) that may store the processor-executable code used by the processor 34 to perform the presently disclosed techniques. The memory 36 and the storage 38 may also be used to store the data, analysis of the data, and the like. The memory 36 and the storage 38 may represent non-transitory computer-readable media (i.e., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to the I/O modules 25 discussed above. Although the block diagram 30 is depicted with respect to the industrial control system 22, it should be noted that the control system for the factory 12, the area 16, the cell 18, and the like may also include the same components to perform the various techniques described herein.

Keeping the foregoing in mind, the industrial control system 22 may use the communication component 32 to communicatively couple to one or more control systems. The industrial control system 22 may also monitor and/or control the operations of each respective component 20, cell 18, area 16, or factory 12. For example, the control system 22 may receive data received from assets, controllers, and the like (e.g., the components 20) that may be located in the factory 12, the areas 16, or the cells 18. In one embodiment, the industrial control system 22 or a control system for each area 16, cell 18, or component 20 may receive information related to how the industrial automation system 10 may be subdivided, how each area 16, cell 18, and component 20 may interact with each other, which components 20 are part of each factory 12, area 16, or cell 18, or the like. For example, each area 16 may be related to a particular process of a manufacturing process. As such, the information received by the respective control system may detail which processes performed in certain areas 16 may depend on other processes being completed in other areas 16.

In certain embodiments, the respective control system may determine how each component 20 may relate to a respective cell 18 or area 16 based on data received from each respective component 20. For instance, a control system of a first component 20 may receive data from multiple other components 20, such as a motor for a conveyer belt and a compressor for some industrial automation device. Upon receiving the data from a second component 20 that corresponds to the motor for the conveyer belt, the control system of the first component 20 may determine that the second component 20 is associated with some cell 18, which may be part of some area 16, based on a speed in which the motor may be operating. That is, the control system of the first component 20 may refer to information, such as system design parameters for the industrial automation system 10, and determine where the motor is located by identifying a motor with operating parameters, as specified by the system design parameters, having a substantially similar speed as the received speed. In certain embodiments, the speed at which the motor may be operating may not be sufficient to identify a particular motor if other motors in the industrial automation system 10 are operating at the same speed. As such, the control system may identify a motor by monitoring a speed profile (i.e., speed curve over time) of each motor in the industrial automation system 10. Additional ways in which a control system may identify particular components 20 may include monitoring an operating mode (e.g., running/stopped/paused) of each component 20, examining network related information (e.g. IP addresses, MAC addresses, sub-net masks, or a combination of any of these, etc.) associated with each component 20, monitoring operating temperatures of each component 20 if available (e.g., components 20 in certain cells 18 are exposed to more heat/cold than others cells 18), monitoring energy consumption data associated with each component (e.g., larger drives could be part of and used in certain cells 18 while smaller drives are used in other cells 18), and so forth.

In any case, after analyzing the data associated with each component 20, the control system of the first component 20 may determine its relationship with other components 20 of the industrial automation system with respect to the various scopes or hierarchical levels of the industrial automation system 10. By understanding the relationship to other components 20 with respect to various scopes of the industrial automation system 10, the control system of the first component 20 may become aware of conditions occurring in processes, areas 16, or cells 18 that may directly or indirectly affect the operations of the first component 20. As such, the control system of the first component 20 may adjust its operations and send commands to other components 20 to adjust their respective operations to compensate or minimize negative consequences that may occur due to the conditions in the areas 16, the cells 18, or the like. For example, production capacity of upstream or downstream cells being automatically adjusted by control systems in the respective cells by monitoring production levels of the cells adjacent to or related to the respective control system. As a result, the control systems may optimize production of the industrial automation system 10 by reducing the effects of bottlenecks cells that may lead to over or under production. In another example, sections of a conveyor used to transport materials may start adjusting their respective speeds based on other sections of the conveyor or production variances associated with the area 16, the cells 18, or the entire factory 12. In yet another example, the control system of the first component 20 may take into account energy consumption data associated with a second component to adjust the operation of the first component 20 (e.g. go to a lower energy consumption mode to maintain overall consumption constant, etc.). Additionally, after each component 20 becomes aware of the presence or existence of another component 20, some of the components 20 may negotiate and determine an optimal production rates for each component 20 based on predetermined criteria such as energy consumption/rates, production mix, production levels, and the like. Keeping the foregoing in mind, an example industrial automation system 10 of a packaging factory 50 and how the packaging factory 50 may be divided and sub-divided into areas 16 and cells 18 are depicted in FIG. 4. As illustrated in FIG. 4, the packaging factory 50 may represent an exemplary high-speed packaging line that may be employed in the food and beverage industry that may process beverage containers (i.e., a beverage line). As such, the packaging factory 50 may include industrial automation components that, for example, may enable machine components to fill, label, package, or palletize containers. The packaging factory 50 may also include one or more conveyor sections that may transport, align, or buffer containers between the machine components. Although FIG. 4 illustrates a packaging factory, it should be noted that the embodiments described herein are not limited for use with a packaging factory. Instead, it should be understood that the embodiments described herein may be employed in any industrial automation environment.

As illustrated in FIG. 4, the packaging factory 50 may include machine components configured to conduct a particular function with respect the beverage packaging process. For example, the beverage packaging process begins at a loading station 52, where pallets of empty cans or bottles to be filled are fed into packaging factory 50 via a conveyor section 54. The conveyor section 54 transports the empty cans from the loading station 52 to a washing station 56, where the empty cans and bottles are washed and prepared for filling. As the washed cans and bottles exit the washing station 56, the conveyor section 54 may gradually transition into an aligning conveyor section 58, such that the washed cans and bottles enter a filling and sealing station 60 in a single-file line.

The filling and sealing station 60 may function at an optimal rate when the washed cans and bottles enter the filling and sealing station 60 in a steady, uniform stream. However, if the transition between the conveyor section 54 and the aligning conveyor section 58 is erratic or faster than desired, the filling and sealing station 60 may not function at an optimal rate. As such, optimizing performance parameters (e.g., speed, size, function, position/arrangement or quantity) of the conveyor sections (i.e., conveyor section 54 or aligning conveyor section 58) may be beneficial to the efficiency of the packaging factory 50.

As the sealed cans exit the filling and sealing station 60, a buffering conveyor section 62 may hold the sealed cans to delay their entry into the next station. In addition, the buffering conveyor section 62 may transport the sealed cans in a single-file line so that the sealed cans arrive at a sterilization station 64 or a labeling station 66 at a desired time with the desired quantity of cans. Similar to the filling and sealing station 60, the packaging station 64 or the labeling station 66 functions efficiently when the buffering conveyor section 62 operates at optimal performance parameters (e.g., optimal speed, size, function, position/arrangement or quantity). After the cans and bottles have been sterilized and/or labeled, they are packaged into cases (e.g., 6-pack, 24-pack, etc.) at a packaging station 68, before they are palletized for transport at station 70 or stored in a warehouse 72. Clearly, for other applications, the particular system components, the conveyors and their function will be different and specially adapted to the application.

The packaging factory 50 may also include the industrial control system 22, which may be located in a control room 74 or the like. The industrial control system 22 may be coupled to one or more sensors 76, which may monitor various aspects of the machine components or conveyor sections of the packaging factory 50. The sensors 76 may include any type of sensor, such as a pressure sensor, an accelerometer, a heat sensor, a motion sensor, a voltage sensor, and the like. The sensors 76 may be located in various positions within the packaging factory 50, and may measure a parameter value of interest relating to the beverage packaging process during the operation of the packaging factory 50. For example, in certain embodiments, the sensors 76 may include sensors configured to measure the rate of bottles or containers per minute (BPM) entering or leaving a machine component (i.e., stations 54, 56, 58, 64, 66, 68 or 70), or the rate of accumulation of bottles on a portion of a conveyor section (e.g., conveyor section 54 or 62). In general, any sensors 76 capable of measuring a parameter value of interest relating to the beverage packaging process of the packaging factory 50 (e.g., rate, pressure, speed, accumulation, density, distance, position/arrangement, quantity, size, and so forth) may be used.

In some embodiments, the packaging factory 50 may include a number of industrial automation power components 78 that may be used to control power used by various machine components in the packaging factory 50. The power components 78 may include devices, such as drives, motors, inverters, switch gear, and the like, which may be used to operate a corresponding machine component. For example, the conveyor section 54 may rotate using a motor, which may be controlled via a power component 78, such as a variable frequency drive.

The power component 78 may include a control system that may monitor and control the operations of the respective power component 78. As such, the power component 78 may correspond to the component 20 described above with respect to FIG. 1. Referring back to the example above, the control system of the power component 78, such as the drive used to control the motor rotating the conveyor section 54, may monitor a voltage provided to the motor and may determine the speed at which the conveyor section 54 may be moving. In one embodiment, the control system of the power component 78 may send the data related to the speed at which the conveyor section 54 may be moving to the industrial control system 22 or to other control systems that may control other components 20. In this manner, the industrial control system 22 or other control systems may be aware of the operations of the power component 78 and may account for these operations when determining how its respective component should operate.

Figure 8:
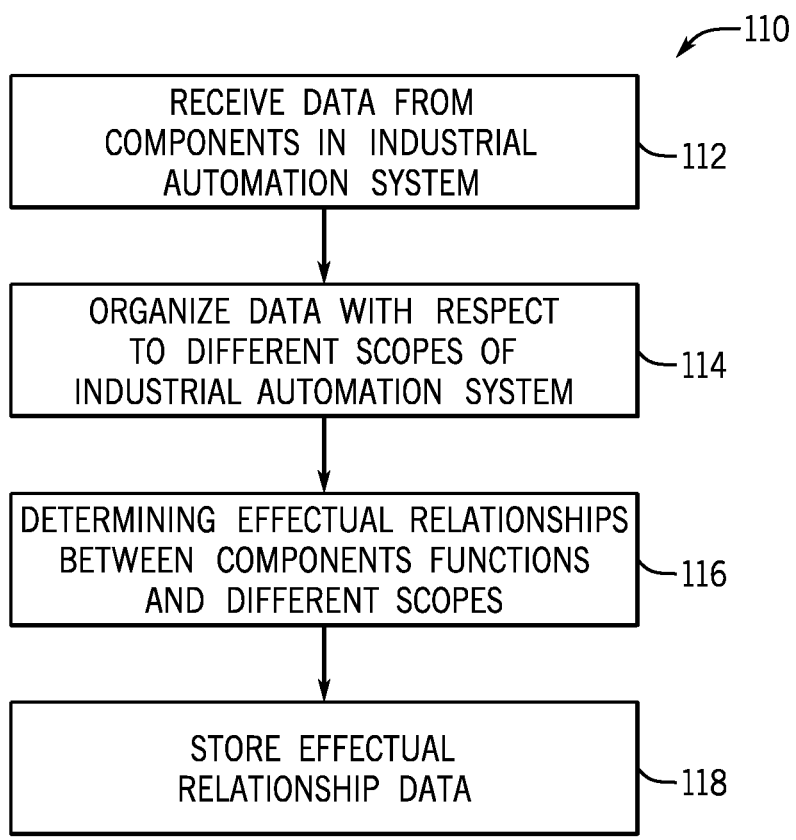
FIG. 8 illustrates a flowchart of a method for determining relationship information between components in the industrial automation system of FIG. 1, in accordance with an embodiment presented herein.

Keeping the packaging factory 50 of FIG. 4 in mind, the industrial control system 22 may receive data from multiple power components 78 dispersed throughout the packaging factory 50. The industrial control system 22 may then contextualize the received data with respect to different scopes or hierarchical levels as described above with reference to FIG. 1. For example, FIG. 8 illustrates how the power components 78 of the packaging factory 50 may be categorized into different scopes.

Figure 5:
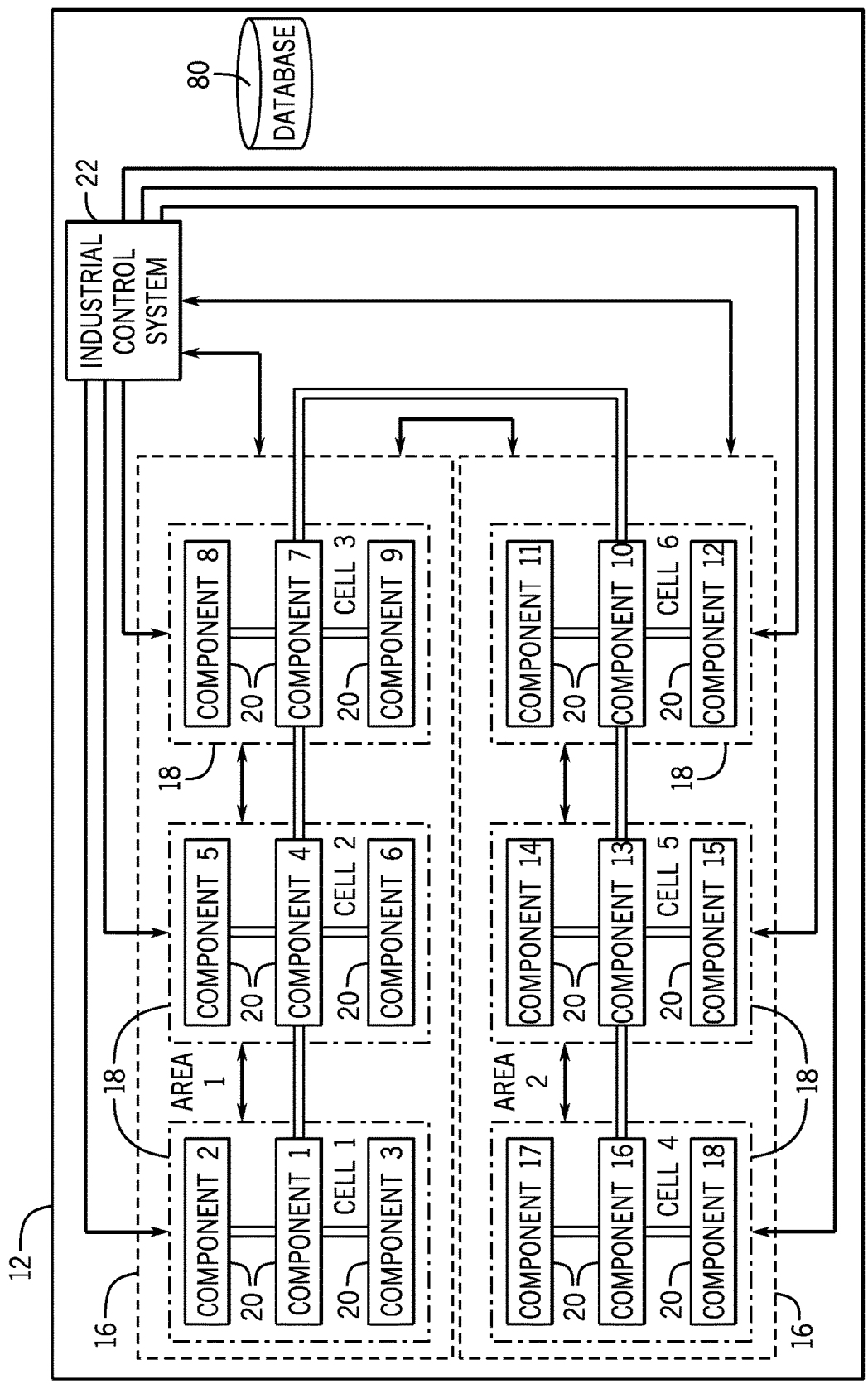
FIG. 5 illustrates a block diagram that depicts hierarchical levels of the example industrial automation system of FIG. 4, in accordance with an embodiment presented herein.

In one embodiment, the scopes of the packaging factory 50 may be categorized based on functions of the components 20 and the cells 18 of the packaging factory 50. For instance, referring to both FIGS. 4 and 5, the loading station 52 may be categorized as cell 1, the washing station 56 may be categorized as cell 2, the sealing station 60 may be categorized as cell 3, the sterilization station 64 may be categorized as cell 4, the labeling station may be categorized as cell 5 and the packaging station 68 may be categorized as cell 6. As shown in FIG. 5, each component 20 may correspond to a particular cell 18. That is, each component 20 that may be used by the respective station may be categorized as part of the respective cell 18.

In the same manner, the areas 16 may be categorized based on functions of the cells 18 of the packaging factory 50. For instance, cells 1-3 of the packaging factory 50 may correspond to a preparation process and cells 4-6 of the packaging factory 50 may correspond to a packaging process. As such, cells 1-3 may be categorized as area 1 and cells 4-6 may be categorized as area 2.

In one embodiment, the industrial control system 22 may determine the categories or scopes of the industrial automation system 10 based on a factory diagram or specification that describes the various processes employed by the industrial automation system 10 and the components 20 used for the respective processes. In another embodiment, each control system for each component 20 may include information indicating the function of the component 20, a location of the component 20 with respect to the industrial automation system 10, a part of a manufacturing process that the component 20 is associated with, or the like. Here, each respective control system of each respective component 20 may send this information to the industrial control system 22 or to other control systems of nearby components 20. The control system that receives the information may then determine how the component 20 that transmitted the information may relate to the various scopes of the industrial automation system 10, how the component 20 that received the information may be related to the component 20 that transmitted the information with respect to the various scopes of the industrial automation system 10, and the like. In certain embodiments, each control system may send information related to the scopes of the industrial automation system 10, information detailing a relationship between each scope of the industrial automation system 10, information detailing a relationship between each component 20 in the industrial automation system with respect to each scope of the industrial automation system 10, and the like to a database 80, which may be accessible by each control system as a centralized database or a database distributed between a number of machines, computers, or the like.

Keeping the foregoing in mind, to share data between control systems, in one embodiment, each industrial control system 22 may first connect to an industrial automation network. The industrial automation network may include a telecommunications network that may allow the industrial control system 22 to exchange data as described above. As such, the industrial automation network may include any type of communicative network including a cloud-based network and the like. The industrial automation network may be present in the industrial automation system 10 and may serve as a way in which to communicate to various devices within the industrial automation system 10. The industrial control system 22 may connect to the industrial automation network via a wired or wireless connection via its communication component 32.

When the industrial control system 22 connects to the industrial automation network, the industrial control system 22 may provide certain information via the industrial automation network to enable other control systems already present or communicatively coupled to the industrial automation network to recognize the industrial control system 22. For example, FIG. 6 illustrates a flowchart of a method 90 that the industrial control system 22 may employ to establish or indicate a presence in an industrial automation network that corresponds to the industrial automation system 10.

Figure 6:
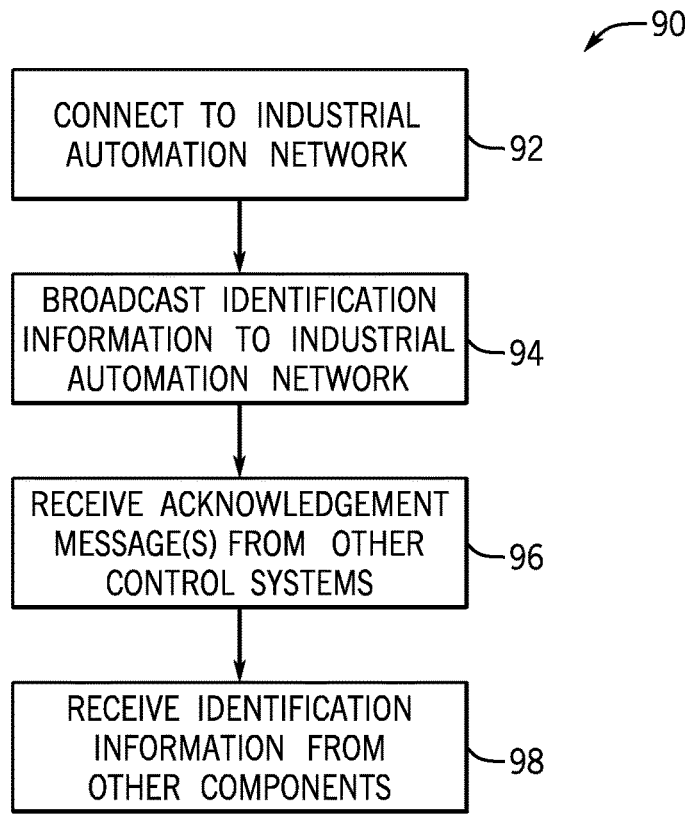
FIG. 6 illustrates a flowchart of a method for establishing a presence of an industrial control system in an industrial automation network associated with the industrial automation system of FIG. 1, in accordance with an embodiment presented herein.

Referring now to FIG. 6, at block 92, the industrial control system 22 may connect to the industrial automation network. In one embodiment, the industrial control system 22 may connect to the industrial automation network using certain verification codes or security parameters that enable the industrial control system 22 to connect to the industrial automation network.

After the industrial control system 22 establishes a connection to the industrial automation network, at block 94, the industrial control system 22 may broadcast data, such as identification information, to the industrial automation network. In one embodiment, the industrial control system 22 may push the data automatically after the connection to the industrial automation network is established. When broadcasting the data, the industrial control system 22 may send a notification or message to each device or control system communicatively coupled to the industrial automation network indicating that the industrial control system 22 has connected to the industrial automation network.

The data or identification information broadcast to the industrial automation network may include certain details associated with the industrial control system 22. For example, the data may include a serial number, a product name, a product class, a type of data output, a list of services provided by the industrial control system 22, and the like that may enable other control systems on the industrial automation network to recognize the type of industrial control system 22 that is now present on the industrial automation network. The data may also include information related to a device or component 20 that may be controlled and/or operated by the control system 22. As such, the data may include information related to certain capabilities of the industrial control system 22. That is, the information may provide details concerning how the industrial control system 22 may be capable of operating certain components 20 and its ability to affect certain operations in the cell 18, the area 16, or the factory 12 of the industrial automation system 10.

In addition to sending identification information, the industrial control system 22 may also send contextual data related to how the component 20, the cell 18, the area 16, or the factory 12 associated with the industrial control system 22 may be related to each other. For example, the industrial control system 22 may send information related to how the industrial automation system 10 may be subdivided, how each area 16, cell 18, and component 20 may interact with each other, which components 20 are part of each factory 12, area 16, or cell 18, or the like, how operations of each component 20 associated with the industrial control system 22 may relate to a respective cell 18 or area 16, system design parameters for the industrial automation system 10, how the industrial control system 22 is related to other components 20 of the industrial automation system 10 with respect to the various scopes or hierarchical levels of the industrial automation system 10, or the like.

The industrial control system 22 may also send a notification or message that lists all of the artifacts or documents that specify operating procedures associated with a respective component 20, cell 18, or area 16. The industrial control system 22 may also send a notification or message that provides a physical description or a list of physical properties of various components 20 associated with the industrial control system 22. As such, an operator may identify various components 20 by their respective physical properties.

The industrial control system 22 may also send information related to a type of material that a respective component 20, a respective cell 18, and a respective area 16 may be using or is expecting to perform work or processing operations on. In another example, the industrial control system 22 may also send information related to a geographical location associated with the respective component 20, respective cell 18, or respective area 16 or a physical location associated with the respective component 20, respective cell 18, or respective area 16 with respect to the industrial automation system 10. Additionally, the information may include a geographical reference that indicates a region (e.g., North America, Asia) in which the respective component 20, respective cell 18, or respective area 16 may be placed into service.

After broadcasting the identification information, at block 96, the industrial control system 20 may receive one or more acknowledgement messages from other control systems or controllers that were previously connected to the industrial automation network. The acknowledgement message may serve as a notice to the industrial control system 22 that its presence has been recognized by the corresponding control system.

In one embodiment, at block 98, the industrial control system 22 may receive identification information associated with the control system that sent the acknowledgement message. The identification information may correspond to the information described above with reference to block 94. By receiving the identification information corresponding to each component 20 joining the industrial automation network, the control system of the newly added component 20 may determine its operating parameters based on the location of the component 20 with respect to the surrounding components 20 and the types of devices correspond to the surrounding components 20. For instance, if a new loading station 52 and a new washing station 56 is added to the packaging factory 50, the control system associated with the buffering conveyor section 62 may determine that it may receive two times as many bottles as it may have previously received since the input mechanisms for the bottles has doubled. As such, the control system for the buffering conveyor section 62 may double the speed at which it operates to increase the production capacity of the packaging factory 50.

In certain embodiments, the industrial control system 22 may include a database of drivers or other software tools that may be used to establish a communication link with and connect to the industrial control system 22 to various components 20, including components that may not be manufactured by the same manufacturer of the industrial control system 22. That is, the industrial control system 22 may be capable of interacting with and controlling various types of components 20 manufactured by various manufacturers using the drivers after the industrial control system 20 detects the presence of the various types of components 20 via the industrial automation network. As such, the industrial control system may be capable of sending control commands to various types of components 20 manufactured by various manufacturers. In one embodiment, the database of drivers may be stored in the memory 36 or the storage 38 of the industrial control system 22. However, it should be noted that the database of drivers may also be stored in a cloud computing device, server, another control system connected to the industrial automation network and the like.

Generally, the drivers may act as a translator between the industrial control system 22 and the corresponding control interface or operating system of the corresponding component 20. As such, by using the driver associated with a particular component 20, the industrial control system 22 may quickly establish a communication link and be capable of controlling the various components 20 without configuring or adjusting configurations of the industrial control system 22. That is, an operator should not have to program or alter the configuration of the industrial control system 22, such that the industrial control system 22 may establish a communication connection with and/or control the operations of the various types of components 20.

Figure 7:
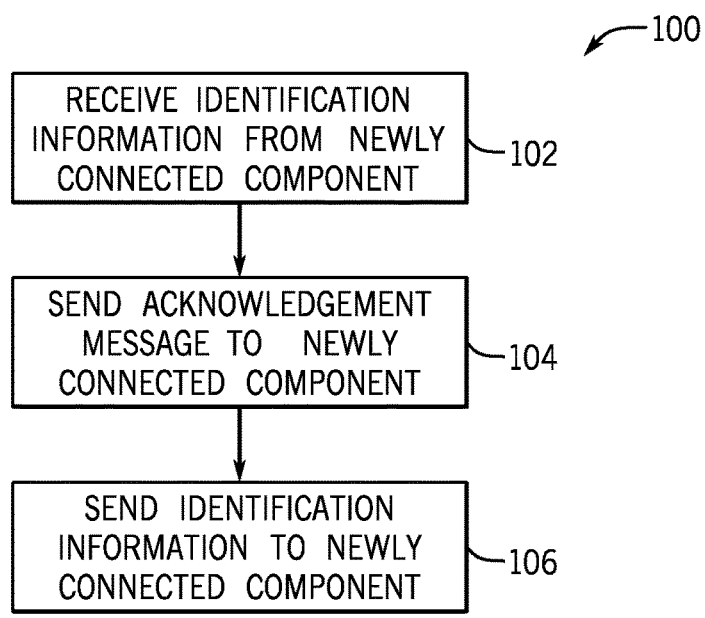
FIG. 7 illustrates a flowchart of a method for recognizing a presence of an industrial control system in an industrial automation network associated with the industrial automation system of FIG. 1, in accordance with an embodiment presented herein.

Keeping the foregoing in mind, FIG. 7 depicts a flowchart of a method 100 that other control systems communicatively coupled to the industrial automation network may employ when recognizing a newly coupled control system. For example, after the industrial control system 22 establishes a connection to the industrial automation network, the control systems or other devices already coupled to the industrial automation network may employ the method 100 to provide an indication to the industrial control system 22 that its presence has been recognized.

Referring now to FIG. 7, at block 102, a control system already connected to the industrial automation network may receive identification information from the industrial control system 22, which may have recently coupled to the industrial automation network. Upon receiving the identification information from the industrial control system 22, the control system may, at block 104, send an acknowledgement message to the industrial control system 22.

At block 106, the control system may send identification information related to itself and its corresponding operations to the industrial control system 22. In one embodiment, the control system may send the identification information to the newly connected industrial control system 22 automatically upon recognizing that the industrial control system 22 has connected to the industrial automation network. As such, each control system coupled to the industrial automation network may become aware of the presence and capabilities of each component available in the industrial automation system 10.

In general, when the control systems described herein become aware of each other, each control system generally recognizes the presence of the respective control systems in the industrial automation network and their respective capabilities and relationships within the industrial automation system. As such, an aware control system may make operational decisions that account for the effects of the decisions with respect to the operations of the other control systems on the industrial automation network. By consciously making operational decisions that account for the operations of other control systems, the aware control system may efficiently manage the operation of the entire industrial automation system 10.

In one embodiment, the industrial control system 22 may analyze the identification information received from each control system on the industrial automation network to determine various characteristics of each control system and its relationship to the industrial automation system 10. For instance, FIG. 8 illustrates a flowchart of a method 110 for determining relationship information between the components 20 of the industrial automation system 10. The method 110 may be performed by the industrial control system 22, but it should be noted that any control system (i.e., with respect to area 16, cell 18, or component 20) may be used to perform the method 110. In one embodiment, the processor 34 of the industrial control system 22 may perform the blocks of the method 110.

Referring now to FIG. 8, at block 112, the industrial control system 22 may receive data from one or more of the components 20 in the industrial automation system 10. The data may include identifying information that corresponds to a particular component 20. The data may also include information related to devices being controlled or operated by the component, information related to power being provided to these devices, information gathered by various sensors disposed on the component 20, and the like.

At block 114, the industrial control system 22 may organize the received data with respect to different scopes of the industrial automation system, as described above. That is, the industrial control system 22 may contextualize the received data with respect to various scopes or hierarchical levels of the industrial automation system 10 based on a diagram or specification that details the operations of the industrial automation system 10.

At block 116, the industrial control system 22 may determine effectual relationships between the components 20, from which the industrial control system 22 may receive data. The effectual relationship may include information indicating how one component 20 may affect the operations of a different component 20. For example, referring back to FIG. 4, if a load increases on the conveyor section 54 (e.g., more bottles on the conveyor), the motor associated with the conveyor section 54 may draw more current from the power component 78 to maintain an expected speed at which the conveyor section 54 operates. As such, upon detecting the increased load, the industrial control system 22 may increase a power demand from the power component 78 to maintain the speed of the conveyor section 54. Moreover, given the load increase, the industrial control system 22 may determine that the washing station 56 should wash each container more quickly and may increase the speed at which the washing station 56 operates. As such, the washing station 56 may draw additional power from a respective power component 78 that may provide power to the washing station 56. In this situation, the industrial control system 22 may determine that the power component 78 associated with the conveyor section 54 may have an effectual relationship with the power component 78 associated with the washing station 56.

After the industrial control system 22 determines the effectual relationship information regarding the components 20 in which it received data from, the industrial control system 22 may, at block 118, store the effectual relationship information as effectual relationship data. In one embodiment, the industrial control system 22 may store the effectual relationship data in the memory 36 or storage 38 components of the industrial control system 22. Alternatively or additionally, the industrial control system 22 may send the effectual relationship data to a control system associated with each component 20 or to the database 80, such that other control systems may access the data and base its operations on the information stored therein.

Figure 9:
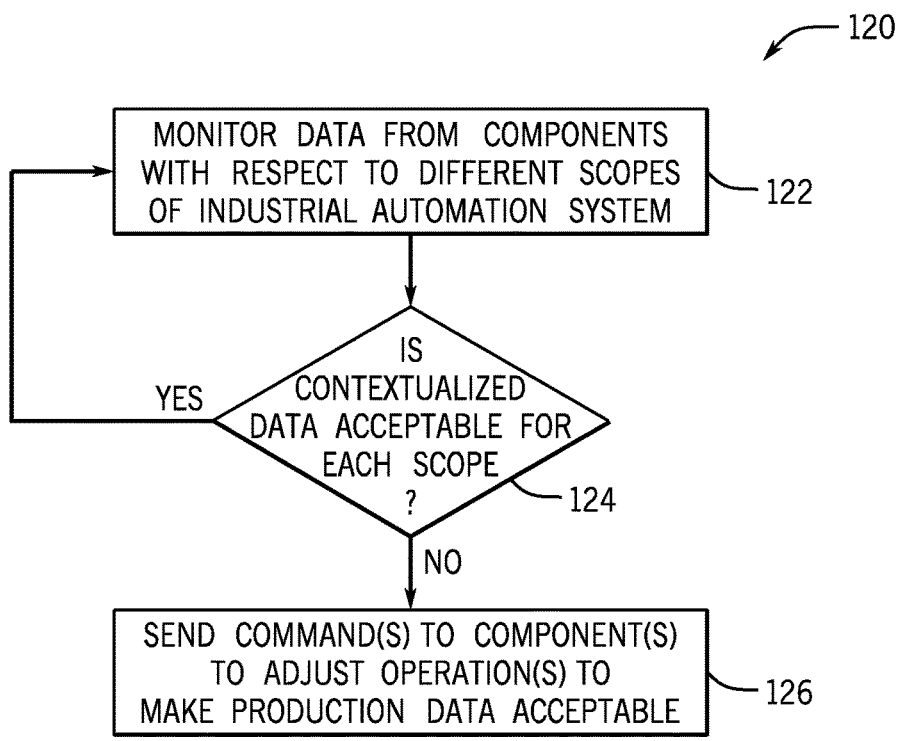
FIG. 9 illustrates a flowchart of a method for controlling operations of industrial automation components based on the relationship information between components in the industrial automation system of FIG. 1, in accordance with an embodiment presented herein.

In certain embodiments, the industrial control system 22 may analyze the data received from each component 20 and adjust the operations of various areas 16, cells 18, or components 20 based on its analysis. FIG. 9, for example, depicts a flowchart of a method 120 for controlling operations of the components 20 based on the effectual relationship data described above. Like the method 120 above, in one embodiment, the processor 34 of the industrial control system 22 may perform the method 120.

Referring now to FIG. 9, at block 122, the industrial control system 22 may monitor data received from the components 20 of the industrial automation system 10 with respect to different scopes of the industrial automation system 10. That is, the industrial control system 22 may receive data from various components 20, contextualize the received data with respect to the factories 14, areas 16, and the cells 18 of the industrial automation system 10.

After contextualizing the received data, the industrial control system 22 may, at block 124, determine whether the contextualized data is within an acceptable range for each respective scope of the industrial automation system 10. In one embodiment, each scope of the industrial automation system 10 may operate according to certain specifications. For example, each scope may be expected to consume a particular range of energy within some period of time. In this example, based on the contextualized energy data for each scope of the industrial automation system 10, the industrial control system 22 may determine whether the energy consumed by each respective scope falls within a respective acceptable range.

If, at block 124, the industrial control system 22 determines that the contextualized data does fall within an acceptable range, the industrial control system 22 may return to block 122 and continue monitoring the data received from the components 20. If, however, the industrial control system 22 determines that the contextualized data does not fall within an acceptable range, the industrial control system 22 may proceed to block 126.

At block 126, the industrial control system 22 may send one or more commands to certain components 20 that may be part of the respective scope of the industrial automation system that does not include contextualized data within an acceptable range. The commands may alter or adjust the operations of the respective component 20 receiving the commands, such that the contextualized data may fall within the acceptable range. As such, in one embodiment, the industrial control system 22 may determine how the operations of each component 20 in each scope of the industrial automation system 10 should be adjusted to ensure that the contextualized data falls within the acceptable range. After determining how the operations of each component 20 in each scope of the industrial automation system 10 should be adjusted, the industrial control system 22 may send corresponding commands to the corresponding components 20 to adjust their respective operations.

Figure 10:
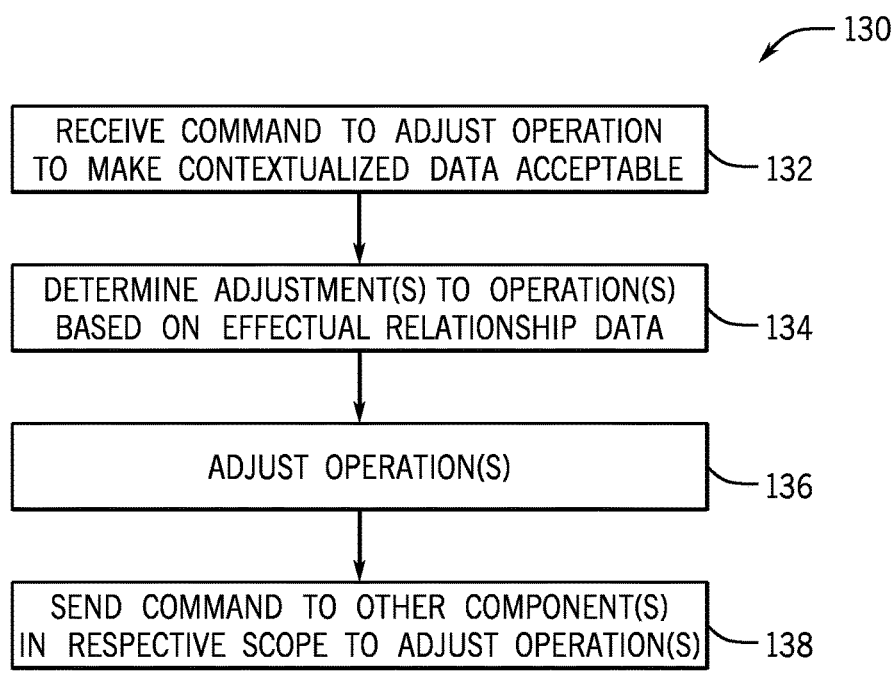
FIG. 10 illustrates a flowchart of a method for adjusting operations of industrial automation components after receiving a command from at least one of the components in the industrial automation system of FIG. 1, in accordance with an embodiment presented herein.

Keeping method 120 in mind, FIG. 10 illustrates a flowchart of a method 130 for adjusting operations of an industrial automation component 20 after receiving a command from another control system. In one embodiment, the method 132 may correspond to the method 120 above in that after the industrial control system 22 sends commands to the components at block 126, the method 130 depicts how the components that receive the commands may adjust its operations.

As such, at block 132, the control system of the component 20 may receive a command to adjust its operations. In one embodiment, the command may simply indicate that the control system should adjust the operations of the component 20 to make the contextualized data fall within an acceptable range.

At block 134, the control system of the component 20 may determine how its operations may be adjusted to make the contextualized data fall within an acceptable range based on the effectual relationship data. That is, the control system may evaluate different adjustments to the operations of its respective component to determine how the adjusted operations may affect the corresponding contextualized data. After determining an adjustment to the operations of its respective component that may assist the contextualized data to fall within the acceptable range, the control system of the component 20 may, at block 136, adjust the operations of the component 20 accordingly.

In one embodiment, while determining an adjustment to the operations of its respective component that may assist the contextualized data to fall within the acceptable range, the control system of the component 20 may determine adjustments that may be made to other components 20 based on the effectual relationship data that may further assist the contextualized data to fall within the acceptable range. As such, at block 138, the control system of the component 20 may send commands to the other components 20 to adjust their respective operations to assist the contextualized data to fall within the acceptable range.

Autonomous Control of Components in Various Hierarchical Levels

Generally, the methods discussed above include adjusting the operations of components 20 that may be communicatively coupled to the industrial control system 22. As discussed above, any component 20 may include a respective industrial control system 22 that may control the respective operations of the respective component 20. Further, in some embodiments, one industrial control system 22 may control the operations of the components 20 in one or more cells 18, one or more areas 16, and the like. As such, the industrial control system 22 may be configured to autonomously control the operations of a single component 20 or a group of components 20. In certain embodiments, the industrial control system 22 may be designated to autonomously control one or more components 20 in the industrial automation system 10 with respect to a corresponding hierarchical level of the one or more components 20 with respect to the industrial automation system 10. That is, a user may specify a hierarchical level of the industrial automation system 10, such that the industrial control system 22 may autonomously control the respective operations of the respective components 20 corresponding to the selected hierarchical level. As a result, the industrial control system 22 may be capable to provide different levels of autonomous control over the industrial automation system 10. In certain embodiments, the industrial control system 22 may also provide multiple levels of autonomous control over the industrial automation system 10. Further, the industrial control system 22 may provide control to just a portion of one or more hierarchical levels of the industrial automation system 10.

The industrial control system 22 may be designated as an autonomous controller for some or all of the components 20 that may be communicatively coupled to the industrial control system 22. That is, the industrial control system 22 may independently control some or all of the operations of certain components 20 in spite of commands or control operations of another control system. For example, the industrial control system 22 may be communicatively coupled to a first component 20, which may be operated by a first control system, and to a second component 20, which may be operated by a second control system. When the industrial control system 22 is designated as the autonomous controller for the first component 20 and the second component 20, the industrial control system 22 may control the operations of the first component 20 and the second component 20 in spite of any conflicting operational commands generated by the first control system or the second control system.

By autonomously controlling the operations of certain components 20 in a particular hierarchical level of the industrial automation system 10, the industrial control system 22 may analyze data associated with the certain components 20 with respect to various parameters associated with the particular hierarchical level that corresponds to the certain components 10. As a result, the industrial control system 22 may control the operations, energy consumption, production, efficiency, and other variables associated with the particular hierarchical level of the industrial automation system 10.

Figure 11:
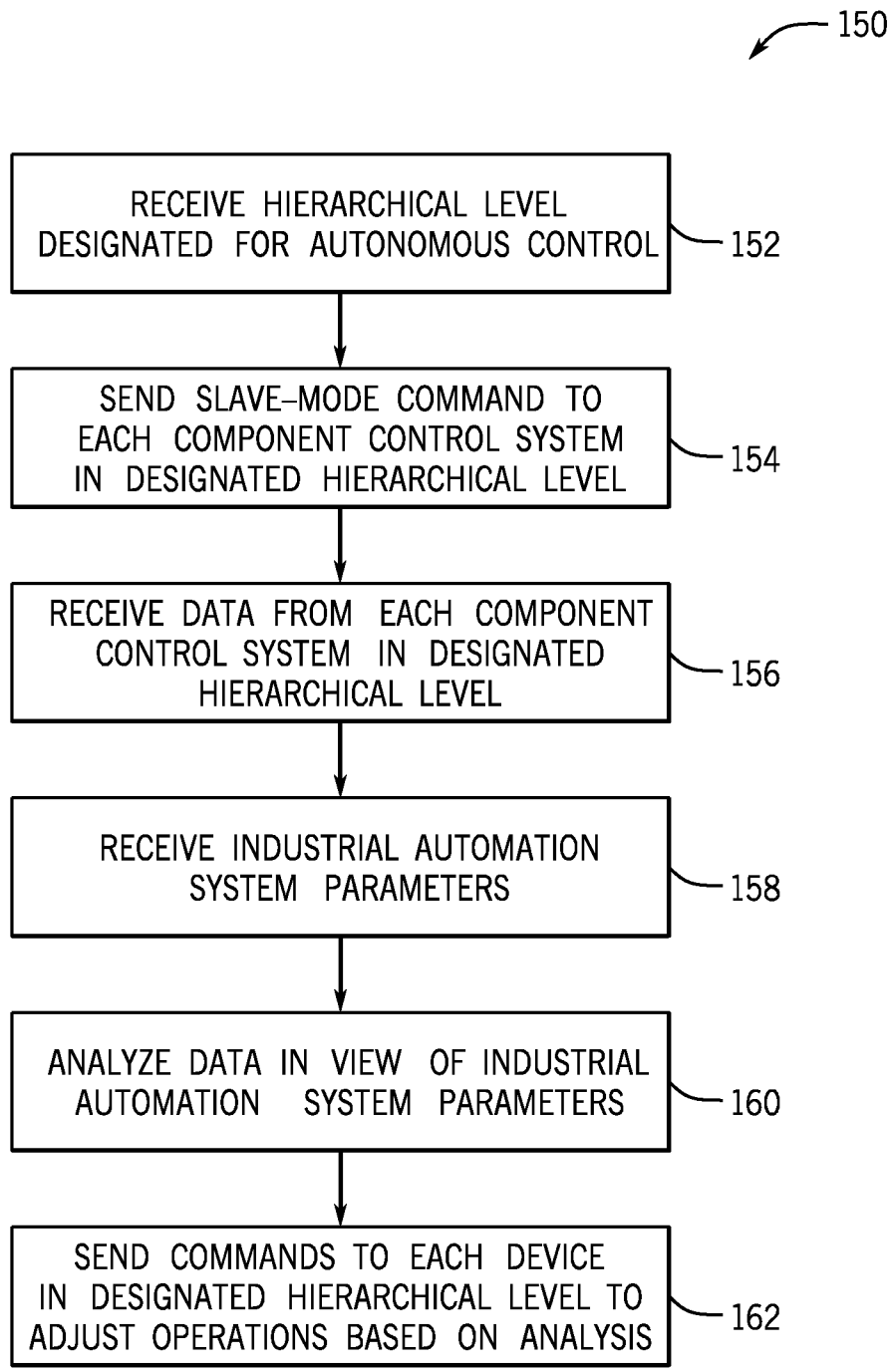
FIG. 11 illustrates a flowchart of a method for providing an industrial control system a level of autonomous control over a portion of the industrial automation system of FIG. 1, in accordance with an embodiment presented herein.

Keeping the foregoing in mind, FIG. 11 illustrates a flow chart of a method 150 that the industrial control system 22 may employ to autonomously control one or more components 20 in the industrial automation system 10 based on a corresponding hierarchical level of the industrial automation system 10. In certain embodiments, the industrial control system 22 may be communicatively coupled to a number of the components 20 that may be disposed at various hierarchical levels of the industrial automation system 10.

At block 152, the industrial control system 22 may receive an input from a user that may specify one or more hierarchical levels in the industrial automation system 10. Referring briefly to FIG. 1, the hierarchical levels of the industrial automation system 10 may include a factory-level (12), a work area-level (16), a cell-level (18), or a component-level (20). Moreover, the selected hierarchical level may include one or more of the work areas 16, one or more of the cells 18, or one or more of the components 20. The industrial control system 22 may receive the input indicating the selected hierarchical levels via the I/O ports 40 of the industrial control system 22. That is, the user may specify to the industrial control system 22 which hierarchical levels may be selected via input from a keyboard device, a mouse device, a touch screen device, or the like. Additional details regarding how the user may select the hierarchical level that includes the components 20 that the user may desire the industrial control system 22 to autonomously control will be provided below with reference to FIGS. 12A-12C.

At block 154, the industrial control system 22 may send a slave-mode command to each control system of each component 20 associated with the selected hierarchical level. Upon receiving the slave-mode command, the respective control system of the respective component 20 may operate as a slave in a master/slave communication configuration. That is, the slave-mode command may cause the respective control system to defer all or a portion of its control operations for the respective component 20 to the industrial control system 22. Prior to receiving the slave-mode command, the respective control system for the respective component 20 may control all of the operations of the respective component 20. In one embodiment, after receiving slave-mode command, the respective control system may continue to control all of the operations of the respective component 20 until the respective control system receives an operational command from the industrial control system 22. That is, when the respective control system receives an operational command from the industrial control system 22 that conflicts with a current operation of the respective component 20, the respective control system may defer to the operational command of the industrial control system 22 and allow the industrial control system 22 to change the operation of the respective component 20 according to the operational command.

In another embodiment, after receiving the slave-mode command, the respective control system may defer all of the operations of the respective component 20 to the industrial control system 22. As such, the respective control system may forward the operational commands received from the industrial control system 22 to the respective component 20. Alternatively, the respective control system may serve as an intermediary or interface that may adjust the operations of the respective component 20 based on the operational commands received from the industrial control system 22.

At block 156, the industrial control system 22 may receive data from each control system of each component 20 in the selected hierarchical level. The data may include raw data acquired via one or more sensors disposed on the respective component 20. The sensors may include rotational sensors, speed sensors, weight sensors, voltage sensors, current sensors, and the like.

The data may also include analyzed or interpreted data that may have been processed by a processor of the respective control system of the respective component 20. For example, the respective control system may receive voltage and current data from sensors disposed on the respective component 20 and may analyze the voltage and current data to determine power consumption properties associated with the respective component 20. In this manner, the industrial control system 22 may receive the analyzed data from the respective control system and thus may not analyze or interpret the raw data received from the sensors disposed on the respective component 20. As such, the processing power of the industrial control system 22 and each respective control system may be used efficiently.

At block 158, the industrial control system 22 may receive one or more industrial automation system parameters that may specify desired properties or characteristics regarding how the industrial automation system 10 or various hierarchical levels of the industrial automation system 10 may operate. In one embodiment, the industrial automation system parameters may include a workflow associated with the industrial automation system 10. The workflow may indicate how each component 20 of the industrial automation system 10 may relate to various processes or hierarchical levels of the industrial automation system 10. Additionally, the workflow may indicate how various hierarchical levels of the industrial automation system 10 may relate to each other with respect to the industrial automation system 10. For example, referring to the packaging factory 50 of FIG. 4, the workflow may provide details indicating that a component 20 (e.g., a motor operating the conveyor section 54) is part of cell 2. Moreover, the workflow associated with the packaging factory 50 may also indicate that the operations of the packaging factory 50 is as follows: cell 1 to cell 2 to cell 3 to cell 4 to cell 5 to cell 6. The workflow associated with the packaging factory 50 may also specify which cells 18 are part of each work area 16. The workflow may also indicate how the industrial automation system 10 may be organized. For instance, the workflow may indicate that the work area 1 feeds into the work area 2.

At block 160, the industrial control system 22 may analyze the data received at block 156 in view of the industrial automation system parameters received at block 158. As such, the industrial control system 22 may determine whether each component 20, cell 18, and work area 16 may be operating according to the industrial automation system parameters. In one embodiment, the industrial control system 22 may aggregate all of the like data from each component 20 in the selected hierarchical level. The industrial control system 22 may then analyze the aggregated data for the selected hierarchical level with respect to the industrial automation system parameters. For example, the industrial control system 22 may aggregate all of the energy consumption data received from the respective components 20 of the selected hierarchical level. The industrial control system 22 may then compare the aggregated energy consumption data to an expected energy consumption value for the corresponding hierarchical level, as specified by the industrial automation system parameters. The industrial control system 22 may generate certain commands for the respective control systems of the respective components 20 of the selected hierarchical level based on the comparison.

At block 162, the industrial control system 22 may send commands to the respective control systems associated with the respective components 20 that correspond to the respective hierarchical level received at block 152 to adjust their operations based on the analysis performed at block 160. That is, if the received data associated with the components 20 of the selected hierarchical level indicates that certain hierarchical levels in the industrial automation system 10 are not operating according to the industrial automation system parameters, the industrial control system 22 may send commands to the respective control systems associated with the respective components 20 of the selected hierarchical level to change its operations. The modified operations of the respective components 20 may cause the hierarchical levels in the industrial automation system 10 to operate according to the industrial automation system parameters.

In certain embodiments, the industrial control system 22 may determine the commands to provide to the respective control systems associated with the selected hierarchical level based on the workflow of the industrial automation system 10. By evaluating the workflow of the industrial automation system 10, the industrial control system 22 may become more aware or cognizant of how the components 20 may affect the operations of the various hierarchical levels, including the selected hierarchical level, in the industrial automation system 10. As such, the industrial control system 22 may account for the effects to the industrial automation system 10 when determining any command for any respective component 20 of the selected hierarchical level. For instance, if the industrial control system 22 receives data indicating that a motor operating the filling and sealing station 60 suddenly changes its operational speed to 50% of its previous operational speed, the industrial control system 22 may analyze the workflow of the packaging factory 50 to determine which components 20 and which hierarchical levels may be affected by the change of operation of the filling and sealing station 60. The industrial control system 22 may then send commands to the control systems associated with the components 20 in the selected hierarchical level to adjust their respective operations in light of the changed operating parameters of the filling and sealing station 60. If the selected hierarchical level received at block 152 includes work area 1 of the packaging factory 50, the industrial control system 22 may identify the components 20 preceding the filling and sealing station 60 (e.g., the conveyor section 54, washing station 56, aligning conveyor section 58) and send commands to the control systems that correspond to the identified components to change the respective operations of the identified components to accommodate or match the current operational speed of the filling and sealing station 60.

By autonomously controlling the operations of the components 20 associated with a particular hierarchical level, the industrial control system 22 may enable the industrial automation system 10 to be controlled more efficiently. In one embodiment, different hierarchical levels of the industrial automation system 10 may be controlled separately by a respective industrial control system 22. As such, the industrial automation system 10 may be controlled or operated according to a decentralized control manner. That is, each autonomous control system may control its respective components 20 of its respective hierarchical level without regard to the operations of other control systems. As such, each respective control system may make distributed decisions for different hierarchical levels of the industrial automation system 10 and how the respective decisions may affect the operations or various properties (e.g., energy consumption, production time, efficiency, etc.) of the components 20 of the corresponding hierarchical level.

Although the industrial automation system 10 is described above as being controlled in a decentralized manner, it should be noted that the selected hierarchical level for the industrial control system 22 may include the entire factory 12. As such, the industrial control system 22 may provide for a centralized control system. That is, the industrial control system 22 may control the operation of each component 20 in the factory 12. In certain embodiments, even when the industrial control system 22 operates as the central control system for all of the components in the industrial automation system 10, the industrial automation system parameters received at block 158 may include specifications or operating specifications for various hierarchical levels of the industrial automation system 10. Here, the industrial control system 22 may operate in a centralized manner and control the operations of each component 20 of the industrial automation system 10 to meet the industrial automation system parameters for the various hierarchical levels.

Whether the industrial control system 22 operates in a centralized or decentralized manner, in certain embodiments, the industrial control system 22 may not be able to accommodate or meet all of the industrial automation system parameters for the selected hierarchical level(s) of the industrial automation system 10. In this case, the industrial control system 22 may prioritize or determine a priority value for each of the industrial automation system parameters. In one embodiment, the industrial control system 22 may establish a priority for each industrial automation parameter based on the workflow that corresponds to the industrial automation system 10. That is, the industrial control system 22 may determine an importance of each hierarchical level or part of the industrial automation system 10 and may determine which of the industrial automation system parameters to accommodate when the accommodation of two or more of the industrial automation system parameters is not possible. In certain embodiments, the user may specify to the industrial control system 22 the priority value of each of the industrial automation system parameters. Alternatively, the user may provide a priority value for each hierarchical level of the industrial automation system 10. As such, the industrial control system 22 may determine which of the industrial automation system parameters to accommodate when the accommodation of two or more of the industrial automation system parameters is not possible based on the priority value provided by the user.

Referring back to block 152, the industrial control system 22 may receive the hierarchical level designated for autonomous control in a number of ways. In one embodiment, the industrial control system 22 may include a graphical user interface (GUI) that may depict certain visualizations that represent the hierarchical levels of the industrial automation system 10. For instance, referring to the example industrial automation system depicted in FIG. 4, the GUI may depict the packaging factory 50 according to the hierarchical levels that correspond to the packaging plant 50 as shown in FIG. 12A.

Referring now to FIG. 12A, in one embodiment, visualizations depicted in a GUI 170 may include a graphical indication 172 of a respective location of the industrial control system 22. For example, as shown in FIG. 12A, the GUI 170 may indicate that component 13 may correspond to the location of the industrial control system 22 by providing the graphical indication 172 that resembles a star graphic in the block that is designated as component 13. Although the graphical indication 172 is depicted in FIG. 12A as a star graphic, it should be noted that the graphical indication 172 may be any type of graphical or visual effect that may enable the user to identify the part of the industrial automation system 10 that may be directly coupled to the industrial control system 22.

In addition to the graphical indicator 172 described above, the GUI 170 may also include a slider visualization 174. The slider visualization 174 may provide the user with an ability to select a hierarchical level of the industrial automation system 10 that the user may desire that the industrial control system 22 may autonomously control. As such, the slider visualization 174 may provide selections for more granular hierarchical levels of the industrial automation system 10 on one end of the slider visualization 174 and may provide selections for broader hierarchical levels of the industrial automation system 10 on another end of the slider visualization 174. For example, as shown in FIG. 12A, one end of the slider visualization 174 may correspond to a component level of the hierarchical levels and the other end may correspond to a factory level of the hierarchical levels. That is, in one embodiment, the most granular hierarchical level of the industrial automation system 10 may correspond to a particular component in the industrial automation system 10, while the broadest hierarchical level of the industrial automation system 10 may correspond to the entire factory 12 of the industrial automation system 10.

Keeping the foregoing in mind, the slider visualization 174 may include a selector 176 that may be moved by the user in either direction of the slider visualization 174. In one embodiment, the position of the selector 176 along the slider visualization 174 may indicate to the industrial control system 22 a selection of a hierarchical level or a number of hierarchical levels that the user may designate as being autonomously controlled by the industrial control system 22. As shown in FIG. 12A, for example, the selector 176 is positioned at the component level end of the slider visualization 174. As such, the GUI 170 may provide a visual indication 178 of the scope or hierarchical level that corresponds to what the industrial control system 22 may autonomously control. In one embodiment, the visual indication 178 shown in FIG. 12A may include a thick or highlighted border around the hierarchical level that corresponds to the location of the selector 176 along the slider visualization 174. However, it should be noted that other visualization effects may be applied to the hierarchical level that corresponds to the location of the selector 176 along the slider visualization 178 to indicate that the respective hierarchical level is selected. Referring again to in FIG. 12A, the visual indication 178 indicates that the hierarchical level that the industrial control system 22 may exert autonomous control over may include the component 20 (i.e., component 13), which may correspond to the location of the industrial control system 22 or the component 20 that may be directly coupled to industrial control system 22.

In certain embodiments, as the selector 176 moves across the slider visualization 174, the scope or hierarchical levels of the industrial automation system 10 selected for autonomous control may change. For example, FIG. 12B illustrates the GUI 170 as shown in FIG. 12A; however, the selector 176 depicted in FIG. 12B is moved towards the opposite end of the slider visualization 174, as compared to FIG. 12A. As such, the visual indication 178 may highlight or encompass a larger scope of the industrial automation system 10 as compared to FIG. 12A. As shown in FIG. 12B, the selector 176 may be positioned at a location along the slider visualization 174 that corresponds to a cell level of the factory 12. As such, the visual indication 178 of FIG. 12B encompasses cell 5 and cell 6 of the factory 12. If the selector 176 moves toward the component level of the slider visualization 174, the visual indication 178 may encompass just cell 5. Moreover, if the selector 176 moves even closer toward the component level of the slider visualization 174, the visual indication 178 may encompass just two components (e.g., components 13 and 14 or components 13 and 15).

Referring now to FIG. 12C, if the selector 176 moves toward the factory level of the slider visualization 174, the visual indication 178 may encompass cell 4, cell 5, and cell 6. As a result, the visual indication 178 may encompass area 2 of the factory 12. In the same manner, if the selector 176 moves further toward the factory level of the slider visualization 174, the visual indication 178 may encompass area 2 of the factory 12 and one component 20 (e.g., component 7) of area 1. As the selector 176 continues to move toward the factory level, the visual indication 178 may encompass additional components 20, cells 18, and areas 16 (e.g., area 1) until it encompasses the entire factory 12.

In addition to specifying various hierarchical levels that the industrial control system 22 may exert autonomous control over, the industrial control system 22 may provide different control options or operational functions based on the user providing the input to the industrial control system 22. That is, the industrial control system 22 may provide different operating options to the user via the GUI 170 based on certain credentials of the user. The credentials of the user may be determined based on a user identification or log in information provided to the industrial control system 22. In one embodiment, the user credentials may indicate to the industrial control system 22 the role of the user with respect to the industrial automation system 10. For example, certain users may be part of an operational or maintenance team, while other users may be part of a supervisory or management team. As such, the industrial control system 22 may provide the respective user different control options based on the corresponding role of the user.

For example, FIG. 13 illustrates a method 190 for modifying control functions of the industrial control system 22 based on a user's credentials. At block 192, the industrial control system 22 may receive user credentials associated with the user operating the industrial control system 22. In one embodiment, the user credentials may be linked to a user identification number or log in information provided to the industrial control system 22.

At block 194, the industrial control system 22 may determine a list of hierarchical levels of the industrial automation system 10 that the respective user may be approved to access or control. In certain embodiments, lower level users (e.g., maintenance/operational personnel) may be limited to using control functions that may control the operation of the component 20 directly coupled to the industrial control system 22 or the operation of lower granular hierarchical levels available. Alternatively, higher level users (e.g., supervisors/managers) may be provided access to additional control functions that may control the operation of the components 20 that may be part of broader hierarchical levels of the industrial automation system 10. In this manner, the higher level users may have greater control of the industrial automation system 10. At block 196, the industrial control system 22 may present the control functions available to the respective user determined at block 194.

Referring back to the method 150 of FIG. 11, in certain embodiments, after receiving the hierarchical level designation at block 152, the industrial control system 22 may employ the method 190 to ensure that the operations of various hierarchical levels of the industrial automation system 10 are not modified by mistake or accident. That is, since a considerable amount of control of the entire industrial automation system 10 may be available via a single industrial control system 22, the user credentials verification process provided by the method 190 may help ensure that the proper personnel has access to various parts of the industrial automation system 10.

Load Balancing

In addition to autonomously controlling different components 20 in the industrial automation system 10 and providing different levels of autonomous control options to user, the industrial control system 22 may also employ various load balancing protocols or algorithms to balance the computational processing loads between various control systems in the industrial automation system 10. That is, as more sensors are added to the component 20 or as the amount of data associated with each component 20, cell 18, work area 16, factory 12, and industrial automation system 10 becomes available, the processing demands associated with the industrial control system 22 may also increase. As with any processor, the processor 34 of the industrial control system 22 may include a limited amount of processing power (e.g., 3.2 gigahertz processor).

In this manner, to effectively control how the components 20 of various hierarchical levels of the industrial automation system 10 operate in real-time or near real-time, the processor 34 of the industrial control system 22 may distribute its processing tasks to various control systems in the industrial automation system 10. In other words, if the industrial controls system 22 determines that it may not be capable to analyze the data associated with each component 20 in a designated hierarchical level of the industrial automation system 10 to adequately operate the various components 20 in real-time or near real-time, the industrial control system 22 may send a request or command to other control systems in the industrial automation system 10 to perform various calculations or data analysis processes to better enable the industrial control system 22 to more effectively operate the components 20 of the industrial automation system 10. As such, in addition to being aware of the operations of each component 20, the industrial control system 22 may also be aware of the processing properties and capabilities of each control system in the industrial automation system 10, such that the industrial control system 22 may employ various processing load balancing techniques to ensure that processing power being used by each control component in the industrial automation system 10 is being used efficiently.

Keeping the foregoing in mind, FIG. 14 illustrates a flowchart of a method 210 for distributing processing workloads to various control systems in the industrial automation system 10. In one embodiment, the method 210 may be performed by the industrial control system 22 that may be designated as an autonomous controller for various components 20 in the industrial automation system 10. However, it should be understood that any control system in the industrial automation system 10 may employ the method 210 to distribute its respective processing workload among other control systems.

For the purpose of facilitating the discussion related to the method 210, FIG. 15 depicts an example communication network 230 that may correspond to the work area 1 of FIG. 5. In one embodiment, each component 20 in the work area 1 may include a respective control system that may include the communication component 32, the processor 34, the memory 36, the storage 38, and the I/O ports 40 as described above with reference to FIG. 3. As such, each respective control system may include a processor that has certain processing capabilities. In addition to possessing certain processing capabilities, each respective control system may include certain processing or data analysis tools, which may be stored in the memory 36 or the storage 38. The processing or data analysis tools may be designed to perform specific tasks or data analysis operations to interpret data acquired by sensors disposed on the component 20 and the like.

As shown in FIG. 15, the industrial control system 22 may correspond to the control system associated with the component 4 of FIG. 5. However, it should be noted that industrial control system 22 may be associated with any component 20 in the industrial automation system 10 or may be a stand-alone computing device as depicted in FIG. 5. In one embodiment, the industrial control system 22 depicted in FIG. 15 may be directly communicatively coupled to control system 1, control system 5, control system 6, and control system 7 (i.e., directly-coupled control systems 232), which may correspond to the control systems for the component 1, the component 5, the component 6, and the component 7 of FIG. 5, respectively. Each of the directly coupled control systems 232 may establish a direct communication link via a wired or a wireless connection, such that communication between the directly coupled control system 232 and the industrial control system 22 may not include any intermediary systems or components.

Additionally, although the industrial control system 22 may not be directly coupled to all of the control systems of the work area 1, the industrial control system 22 may establish an indirect communication link with other control systems via the directly coupled control systems 232. As such, the industrial control system 22 may communicate with indirectly coupled control systems 234 via the directly coupled control systems 232. That is, the directly coupled control system 232 may relay requests, commands, and data between the industrial control system 22 and the indirectly coupled control systems 234. In this way, the industrial control system 22 may further control the operations of the components 20 that may not be directly communicatively coupled to the industrial control system 22. Moreover, by establishing a communication means between the industrial control system 22 and the indirectly coupled control systems 234, the industrial control system 22 may further distribute the processing work load of the industrial control system 22 to the directly coupled control systems 232 and the indirectly coupled control systems 234.

Keeping the communication network 230 of FIG. 15 in mind and referring back to the method 210 of FIG. 14, at block 212, the industrial control system 22 may send a request to each control system in a particular hierarchical level. The request may be a request to provide processing information related to each respective control system. In one embodiment, the industrial control system 22 may send the request to each directly coupled control system 232 via the direct communication link between the industrial automation system 22 and the directly coupled control systems 232.

If the selected hierarchical level includes other indirectly coupled control systems 234, upon receiving the request from the industrial control system 22, the directly coupled control systems 232 may forward the request to the control systems directly communicatively coupled to the directly coupled control systems 232. For example, control system 1 and control system 7, which are directly coupled control systems 232 with respect to the industrial control system 22, may forward a request received from the industrial control system 22 to the control system 2, control system 3, control system 8, and the control system 9 of FIG. 15. As such, the industrial control system 22 may send a request for processing information to the indirectly coupled control systems 234.

The processing information may include various details or properties regarding the communication component 32, the processor 34, the memory 36, and the storage 38 of each respective control system. For instance, the processing information may include a list of capabilities of the respective control system, such as a bandwidth of the communication component 32, a processing speed of the processor 34, an amount of memory available in the memory 36, a list of programs and/or data processing tools that may be stored in the storage 38, and the like. The processing information may also include some indication detailing how much of the processing power of the processor 34 of the respective control system is being used. In one embodiment, the processing information may provide a percentage value to represent how much of the total processing power of the processor 34 of the respective control system is being used to perform the various processes of the respective control system. The percentage value may thus correspond to a processing load of the processor 34.

At block 214, the industrial control system 22 may receive the processing information from each respective control system. Upon receiving the processing information, at block 216, the industrial control system 22 may determine whether the processing load between each respective control system in the selected hierarchical level is balanced. In one embodiment, the industrial control system 22 may determine whether the processing load of each respective control system is within some percentage or range (e.g., 5-10%) of an average processing load of all of the control systems (including the processing load of the industrial control system 22) in the selected hierarchical level.

If, at block 216, the industrial control system 22 determines that the processing loads between each of the respective control systems of the selected hierarchical level is balanced, the industrial control system 22 may return to block 214 and continue to receive the processing information from each respective control system. If, however, at block 216, the industrial control system 22 determines that the processing loads between each of the respective control systems of the selected hierarchical level is not balanced, the industrial control system 22 may proceed to block 218.

At block 218, the industrial control system 22 may distribute the processing loads of each respective control system based on the received processing information. That is, the industrial control system 22 may first identify certain control systems that may be have a processing load that is lower than the average processing load between the respective control systems. The industrial control system 22 may then identify certain processing operations being performed by other control systems 22 that may have processing loads that may be higher than the average processing load and may distribute some of the processing operations of the control systems having the above-average processing load to the control systems having the below-average processing load.

In certain embodiments, at block 218, the control system 22 may send recommendations to each respective control system indicating how the processing loads of each respective control system may be distributed. In this manner, the user of the control system 22 may provide an input to proceed adjusting the processing loads of each respective control system, as opposed to the processing loads being automatically adjusted.

After distributing some of the processing load between control systems at block 218, the industrial control system 22 may return to block 214 and receive updated processing information from each respective control system. As such, the industrial control system 22 may again determine whether the processing load between each respective control system is balanced at block 216 and may further distribute the processing loads between each control system at block 218.

In certain embodiments, the industrial control system 22 may distribute the processing loads between the control systems based on various properties associated with each control system. For example, certain control systems may include specific data analysis tools while other control systems may not. As such, when distributing processing loads between the control systems, the industrial control system 22 may identify a control system that has the data analysis tools stored thereon before requesting that a particular control system performs the respective processing operations.

Additionally, to better achieve processing load balancing between the control systems of the selected hierarchical level, the industrial control system 22 may determine which of its processing operations may be more efficiently performed by other control systems. For example, if the industrial control system 22 calculates the power consumption properties of each cell 18, the industrial control system 22 may receive power consumption data from each control system in each cell 18 and may then aggregate the power consumption data with respect to each cell 18. In one embodiment, instead of performing the aggregation calculations using the processor 34 of the industrial control system 22, the industrial control system 22 may send a command to one control system in each cell 18 to determine the power consumption data for the respective cell 18. Each respective control system designated to determine the power consumption data for the respective cell 18 may then send the aggregated power consumption data for the respective cell 18 to the industrial control system 22. For example, referring to FIG. 15, the industrial control system 22 may send a command to the control system 7 to determine the power consumption data for the corresponding cell 18 (cell 3). As such, the control system 7 may receive power consumption data from the control system 8 and the control system 9 and aggregate the received power consumption data with the power consumption data that the control system 7 has attributed to its respective component (i.e., component 7). As a result, the control system 7 may determine the power consumption data for the cell 3 and may send the power consumption data to the industrial control system 22, thereby preserving some of the processing power of the industrial control system 22 that previously would have been used to aggregate the received data from each control system in cell 3.

In one embodiment, the industrial control system 22 may preserve its processing power for various decision making processes regarding the control of various operations of the components 20 in various hierarchical levels of the industrial automation system 10. As such, the industrial control system 22 may identify different control systems in the industrial automation system 10 that may be capable of performing various intermediate processing tasks that may result in data that may determine how the components 20 should operate.

In yet another embodiment, the industrial control system may distribute the processing loads between control systems by designating one or more control systems of a particular hierarchical level as responsible for performing various calculations and data analysis associated with the components 20 of the particular hierarchical level. That is, one or more control systems that are part of a particular hierarchical level may perform all of the data analysis operations for the components 20 of the particular hierarchical level. The one or more control systems may then forward the results of the data analysis operations to the industrial control system 22, such that the industrial control system 22 may operate the industrial automation system 10 in view of the data analysis results.

In addition to monitoring the balance of the processing loads in real time, the industrial control system 22 may predict whether the processing loads of the control systems being monitored may become unbalanced. Keeping this in mind, FIG. 16 illustrates a flowchart of a method 240 for balancing processing workloads of control systems in the industrial automation system of FIG. 1 based on predicted workloads for the control systems.

At block 242, the industrial control system 22 may receive processing information from each control system (i.e., directly coupled and indirectly coupled) as described above with reference to block 214 of FIG. 14. In one embodiment, the industrial control system 22 may identify the processing load of a corresponding control system from the processing information.

At block 244, the industrial control system 22 may store the processing information or the processing load of each respective control system in the memory 36 or the storage 38. In one embodiment, the industrial control system 22 may store the processing load of each respective control system in a look up table that may be indexed according to a time at which the processing information was received.

After storing the processing information, the industrial control system 22 may wait for some amount of time to expire. The amount of time that the industrial control system 22 may wait may correspond to an input received from a user. As such, the user may specify to the industrial control system 22 a frequency at which the industrial control system 22 may evaluate the processing information received from the respective control systems. After the amount of time expires, at block 246, the industrial control system 22 may again start receiving the processing information from the respective control systems.

At block 248, the industrial control system 22 may compare the processing information stored at block 244 to the processing information received at block 246. In one embodiment, if a change between the processing load stored at block 244 and the processing load received at block 246 is not greater than the threshold, the industrial control system 22 may return to block 244 and store the recently received processing information or the processing load. If, however, the change between the processing load stored at block 244 and the processing load received at block 246 is greater than some threshold, the industrial control system 22 may proceed to block 250. At block 250, the industrial control system 22 may distribute the processing workloads between the respective control systems as described above with reference to block 218 of FIG. 14.

The method 240 illustrates one example in which the industrial control system 22 may predict whether the processing work loads between the control systems of some hierarchical level of the industrial automation system 10 may become unbalanced in the future. That is, if the change in the processing load determined at block 248 exceeds the threshold, the industrial control system 22 may determine that the processing load between the respective control systems may become unbalanced at some time in the future. As such, the industrial control system 22 may preemptively distribute the processing work loads between the respective control systems before the processing work loads become unbalanced.

In certain embodiments, the industrial control system 22 may also predict whether the processing work loads may become unbalanced by evaluating data processing operations of each respective control system or the industrial control system 22 over some amount of time. That is, the user may specify to the industrial control system 22 an amount of time to analyze the processing load of one or more control systems in the industrial automation system 10. The industrial control system 22 may then evaluate or monitor the processing load of the respective control system, which could include the processing load of the industrial control system 22, itself. If the industrial control system 22 determines that the processing load of the respective control system over the amount of time is greater than some threshold, the industrial control system 22 may distribute the processing work loads between various control systems as described above. Here, the threshold may be represented as a load over time curve.

In addition to balancing processing loads between various control systems, the industrial control system 22 may also dynamically balance power loads between areas 16, cells 18, and the like. For example, FIG. 17 illustrates a flow chart of a method 260 for power balancing operations of the industrial automation system 10. Power balancing the operations of the industrial automation system 10 may generally include monitoring the power consumption properties associated with various hierarchical levels of the industrial automation system 10 and adjusting the operations of various components 20 to ensure that the power consumption loads between each hierarchical level of the industrial automation system 10 may be balanced. The method 260 is described below as being performed by the industrial control system 22, but it should be understood that any control system or multiple control systems may employ the method 260.

At block 262, the industrial control system 22 may receive power consumption data associated with each hierarchical level of the industrial automation system 10. In one embodiment, the industrial control system 22 may receive an input from a user that specifies one or more hierarchical levels in the industrial automation system 10. In this case, the industrial control system 22 may receive the power consumption data associated with the selected hierarchical level. In certain embodiments, the industrial control system 22 may receive the power consumption data from a particular control system designated to determine the power consumption data for a respective hierarchical level as mentioned above. Alternatively, the industrial control system 22 may receive the raw power consumption data from each control system in each hierarchical level and calculate the power consumption data associated with each hierarchical level.

After receiving the power consumption data of each hierarchical level (or the selected hierarchical levels), at block 264, the industrial control system 22 may determine whether the power load of each hierarchical level is balanced. Determining that the power load of each hierarchical level is balanced may include determining that the power consumed in certain hierarchical levels or areas within one or more hierarchical levels are below a certain threshold for each hierarchical level. That is, the industrial control system 22 may determine whether the power load of each respective hierarchical level is within some percentage or range (e.g., 5-10%) of a respective power load threshold associated with each hierarchical level.

In one embodiment, the power consumption data may include information related to an amount of energy consumed by one or more components 20 in the component-level, cell-level, area-level, or factory-level of the hierarchical levels. The information related to the amount of energy consumed by the components 20 may include data related to the amount of energy consumed when the respective components 20 are powered off, operating at reduced energy levels (e.g., sleep mode), and powered back on again. In addition to the power consumption data, the industrial control system 22 may also receive historical data associated with an expected amount of idle time for each respective component 20. Upon receiving the power consumption data and the historical idle time data, the control system 22 determine an amount of energy consumed by the respective components 20 when powering down during the expected idle times, operating in a reduced power mode during the expected idle times, and the like.

The power consumption data may also include information related to how the change in power modes of certain components 20 may affect the power consumption or demand in other components 20. As such, the control system 22 may recognize that changes to the power operations on one component 20 may imply that there will be a new demand in another component 20.

Keeping the forgoing in mind, the control system 22 may also receive an objective for power management that may include reducing overall energy/power consumption of a particular hierarchical level in the industrial automation system 10 or more reducing a cost of energy used to produce products. To reduce the cost of energy used to produce products or operate the industrial automation system 10 (or various hierarchical levels in the industrial automation system 10), the control system 22 may, as described below, analyze historical data associated with the power consumed by the components 20 that correspond to the data received by the control system 22, operating relationships between the respective components 20, relationships to functions being performed by the industrial automation system 10 and the components related to those functions, an energy cost schedule, and the like. Based on the analysis of this data, the control system 22 may determine operations and/or adjust operations of various components 20 to meet the power management object.

By way of example, the control system 22 may received data related to discovered energy relationships between components 20, a schedule of energy costs, a forward looking production schedule, and a known relationships between components 20 involved in the production schedule. The control system 22 may then identify certain times at which different operations for different components 20 should be performed to minimize total energy cost, while also meeting the production schedule. That is, the control system 22 may receive an energy cost schedule that indicates a price for energy at various times during the day, week, year, etc. The control system 22 may then perform operations for components 20 that use significant energy at times when energy costs are lower than peak demand times.

If the power consumption data indicates that the power between various parts of one or more hierarchical levels is balanced, operating under a respective threshold, or is efficiently consuming energy, the industrial control system 22 may return to block 262. If, however, the power consumption data indicates that the power between various parts of one or more hierarchical levels is unbalanced, operating over a respective threshold, or is not efficiently consuming energy, the industrial control system 22 may proceed to block 266.

At block 266, the industrial control system 22 may send commands to certain components 20 or to control systems that correspond to the certain components 20 to alter or adjust its operations. The adjusted operations may cause the components 20 to adjust their operations, such that the power balance between each part of a respective hierarchical level may remain balanced or operating under a respective threshold. For example, the industrial control system may determine that the power drawn from a particular area 16 is above a certain threshold. If one particular cell 18 (e.g., cell 1) of an area 16 is drawing more power than another cell 18 (e.g., cell 2) in the same area 16, the industrial control system 22 may adjust the operations of the components 20 in cell 1 to consume less power to reduce the overall power drawn from the area 16. In one embodiment, any changes to the operations of the components 20 may be made after the industrial control system 22 determines whether the changes would enable the industrial automation system 10 to continue operating as per certain system design parameters, any specified operating parameters, or the like.

As such, the commands sent to the components 20 may include minimizing an amount of power used over some section of equipment within a respective hierarchical level (i.e., to stay within some overall threshold). As such, the industrial control system 22 may defer or slow down certain operations of certain components 20 to keep the respective hierarchical level at some threshold associated with the respective hierarchical level or to keep the overall industrial automation system 10 under some threshold associated with the overall industrial automation system 10.

After sending the commands to the components 20, the industrial control system 22 may return to block 262. As such, the industrial control system 22 may continuously monitor the power balancing properties of the industrial automation system 10.

Controlling Operations Based on Multiple Data Sources

As mentioned above, the industrial control system 22 may use a number of control systems in the industrial automation system 10 to perform various data processing tasks. Keeping this in mind, with the increased amount of data that may be collected from the industrial automation system 10, the control systems may collectively process the voluminous amount of collected data to identify patterns in the data that may indicate certain characteristics or prognostics related to the industrial automation system 10. That is, the control systems may evaluate the collected data to determine different manners in which various components in the industrial automation system 10 may be operated to improve efficiency or effectiveness of the items being produced or manufactured via the industrial automation system 10. In certain embodiments, the control systems present in the industrial control system 22 may not include sufficient processing power and/or storage capabilities to process all of the collected data from the industrial automation system 10, in addition to analyzing data collected from various other industrial automation systems. Moreover, the data collected from the industrial automation system 10 may be so large and complex that the control systems of the industrial automation system 10 may not be capable of processing all of the data using their collective processors or data processing applications. As such, in one embodiment, the industrial control system 22 may be part of a data analysis system 270, as illustrated in FIG. 18.

Referring now to FIG. 18, the data analysis system 270 may include a local industrial control system 22 (which may be associated with a local factory 12), the database 80, one or more servers 272, a cloud-computing device 274, and the like. In certain embodiments, the servers 272 may include a computer or a collection of computers that may perform various processing or data analysis operations.

The cloud computing device 274 may include a number of computers that may be connected through a real-time communication network, such as the Internet, EtherNet/IP, ControlNet, or the like. In one embodiment, large-scale analysis operations may be distributed over the computers that make up the cloud-computing device 274. Generally, the computers or computing devices provided by the cloud-computing device 274 may be dedicated to performing various types of complex and time-consuming analysis that may include analyzing a large amount of data. As a result, the industrial control system 22 or other controllers that may be associated with managing the operations of a respective component 20, cell 18, or area 16, may continue its respective processing operations without performing additional processing or analysis operations that may involve analyzing large amounts of data collected from various industrial control systems.

The large amount of data collected from various control systems associated with various industrial automation systems may commonly be referred to as big data. With the increased availability of big data due to the communication abilities of control systems, the big data may be analyzed or used as a reference to identify similar patterns of data between two or more industrial automation systems. By identifying similar patterns between two or more industrial automation systems, the cloud computing device 274, the servers 272, or the industrial control system 22 may diagnose certain problems in a respective industrial automation system, predict when problems may arise in the respective automation system, determine how operations may be adjusted in the respective automation system, and the like.

Keeping the foregoing in mind, the local industrial control system 22, the servers 272, and the cloud-computing device 274 may communicate with each other as shown in FIG. 18. For the purpose of discussion, the following description of the operations and tasks capable of being performed by the local industrial control system 22, the servers 272, and the cloud-computing device 274 will be discussed as being performed by the cloud-computing device 274. However, it should be understood that the local industrial control system 22 (or a number of industrial control systems) or the servers 272 may also be used to perform the operations discussed below.

As mentioned above, the cloud-computing device 274 may be communicatively coupled to the local industrial control system 22 and the database 80 via the industrial automation network discussed above. In this manner, the local industrial control system 22 may send raw data it acquires via sensors communicatively coupled to the local industrial control system 22 to the cloud-computing device 274. In certain embodiments, the local industrial control system 22 may perform certain analysis on the raw data. In this case, the local industrial control system 22 may also send the results of these analyses to the cloud-computing device 274. As such, the cloud-computing device 274 may receive any type of data that may be received by or processed by the local industrial control system 22.

The cloud-computing device 274 may also receive data from other industrial control systems 22 disposed in the local factory 12. Additionally, the cloud-computing device 274 may receive data from other industrial control systems 22 that may be disposed in different factories 12. In certain embodiments, the different factories 12 may not be related to each other. That is, each factory may be owned and operated by separate entities and may manufacture or produce similar or different products. Moreover, each factory may be part of the same or different industries. Nevertheless, the data received by the cloud-computing device 274 from each industrial control system 22 in each factory 12 may include data related to similar components 20 or a group of components 20 (e.g., cell 18 or area 16) operating together in a similar manner. As such, the cloud-computing device 274 may analyze the data from each industrial control system 22 and identify patterns within the data that may indicate how components 20 from two or more different factories may be operating under similar load or operating conditions.

In addition to receiving data from various industrial control systems 22, the cloud-computing system 274 may also receive data related to the operations of various components or group of components 20 from the database 80. For example, as shown in FIG. 18, the database 80 may include data 276 associated with different factories 12. In certain embodiments, the data 276 may also include data from other industrial control systems 22 in the same local factory 12 as the local industrial control system 22. It should be noted that the database 80 may also include hierarchy information, effectual data information, workflow information, and other types of data discussed throughout the present disclosure.

The data 276 may also include empirical data provided by various manufacturers and the like. The empirical data may include historical data associated with the operations of the components 20 by each respective manufacturer over time. As such, the database 80 may include data 276 related to different industries and associated with different periods of time (e.g., days, weeks, years).

Keeping the foregoing in mind, FIG. 19 illustrates a method 280 that the cloud-computing device 274 may employ for controlling operations of the components 20 of the local factory 12 based on big data acquired by the cloud-computing device 274. As mentioned above, although the following description of the method 280 is described as being performed by the cloud-computing device 274, it should be noted that the server 272, the local industrial control system 22, or a group of industrial control systems 22 may perform the method 280 described below.

Referring now to FIG. 19, at block 282, the cloud-computing device 274 may receive a first set of data associated with the local components 20 of the local factory 12. The first set of data may include raw data and/or processed data associated with the local components 20 of the local factory 12. In one embodiment, the first set of data may be received from one or more local industrial control systems 22 that may be associated or communicatively coupled to the local components 20 of the local factory 12.

At block 284, the cloud-computing device 274 may receive a second set of data associated with other components 20 of one or more other factories 12. That is, the second set of data may include data similar to the local components 20 of the local factory 12, even though the other components 20 may be operating in different factories 12. After receiving the second set of data, in one embodiment, the cloud-computing device 274 may review configuration data for other components 20 to identify components 20 in the second set of data that are configured (i.e., arranged) and used similar to the local components 20. The cloud-computing device 274 may then analyze and/or compare the operational and configuration data between those similar components 20 to determine various operational adjustments for the local components 20.

Keeping this in mind, the components 20 of any factory 12 may generally work together to perform various operations related to production or processing within the factory 12. For example, an electric drive component may be used to control a motor component in a number of different factories 12, which may be producing or manufacturing different products. Although each different factory 12 may produce a different product, some of the components 20 of each factory 12 may perform similar functions.

Referring back to the example presented above, an electric drive component in a first factory 12 may control a speed of a motor component based on various operational parameters related to producing a first type of product in the first factory 12. Although a second factory 12 may produce a second type of product, the second factory 12 may use a similar electric drive component and a similar motor component as used in the first factory 12. However, the electric drive component and the motor component used in the first factory 12 may operate differently as compared to the electric drive component and the motor component used in the second factory 12. For instance, the electric drive component used in the first factory 12 may operate the respective motor component at a first speed, while the electric drive component 20 of the second factory may operate the respective motor component at a second speed. Even though the electric drive component from each different factory 12 may operate the respective motor component at different respective speeds, the data representative of the operating characteristics of each electric drive component and motor component is valuable for determining how to efficiently operate each respective component, diagnosing problems in each respective component, maintaining each respective component, and the like.

Referring back to block 284, in certain embodiments, the cloud-computing device 274 may receive the second set of data via the database 80, the servers 272, or the like. As mentioned above, the second set of data may include data from different factories 12 as compared to the local factory 12 that corresponds to the first set of data. The second set of data may include information regarding the operating parameters of the components 20, the power consumption of the components 20, the operating load of the components 20, the maintenance history of the components 20, and the like.

Although it has been noted that the second set of data may include data from different factories 12 as compared to the local factory 12 that corresponds to the first set of data, it should be noted that the second set of data may also include data from the same local factory 12 that corresponds to the first set of data. That is, the second set of data may include empirical or historical data related to the operations of the components 20 in the respective factory 12 over some amount of time (e.g., weeks, months, years).

Keeping the foregoing in mind, at block 286, the cloud-computing device 274 may analyze the first set of data in view of the information related to other components 20 of the second set of data. As such, the cloud-computing device 274 may compare the first and second sets of data to identify patterns of similar data between the two datasets. For instance, the similar patterns of data may include similar operating parameters of the components 20 from the local components 20 as compared to the other components 20, similar power consumption characteristics between the local components and the other components 20, similar maintenance operations performed on the local components 20 and the other components 20, and the like. In one embodiment, after receiving data associated with similar components 20 as compared to the local components 20 for some amount of time (e.g., one month), the cloud-computing device 274 may determine various ways in which the production of the local factory 12 or the operations of the local components may be optimized based on trends or other analysis determined based on the data acquired over time.

Further, instead of analyzing the first and second sets of data, the cloud-computing device 274 may analyze just the second set of data. By analyzing just the second set of data, the cloud-computing device 274 may still identify patterns in the second set of data. The cloud-computing device 274 may use the identified patterns in the second set of data to predict how the local components 20 may perform when operating under similar circumstances as the identified patterns.

In any case, upon identifying patterns in the first and/or second sets of data, at block 288, the cloud-computing device 274 may perform various types of analyses on the first set of data based on the identified patterns. That is, the cloud-computing device 274 may analyze the first set of data with respect to the identified patterns to determine additional details with regard to the operations or efficiency of the components 20 of the local factory 12.

In one example, upon analyzing the first set of data with respect to the identified patterns, the cloud-computing device 274 may determine certain expected values for various operating parameters of certain components 20. For instance, after analyzing temperature data for various components 20 operating under different conditions (e.g., loads, environments, etc.), the cloud-computing device 274 may determine an expected temperature value for the local component 20 operating under its current condition. Moreover, the cloud-computing device 274 may determine an expected temperature value for the local component 20 when the local component 20 is operated at different conditions. That is, an operator may adjust the operations of the local component 20 and may use the expected temperature value at the adjusted operation conditions, as determined by the cloud-computing device 274, to verify that the local component 20 is operating correctly. As such, by analyzing the similar data patterns associated with other components 20, the cloud-computing device 274 may determine effective operating parameters for the local components 20 even though the local components 20 may not have been operated in the same manner in the past. In this manner, the additional analysis determined using the big data associated with the components 20 may provide better insight and understandings as to how to increase the efficiency or the effectiveness of the production of the local factory 12.

Additional examples of the types of analyses that may be performed at block 288 are presented in a flow diagram 300 of FIG. 20. Referring briefly to FIG. 20, at block 302, the cloud-computing device 274 may compare energy consumption data (e.g., first set of data) associated with the local components 20 monitored or operated by the local industrial control system 22 with energy consumption data (e.g., second set of data) associated with other components 20 in different factories 12, as discussed above. The energy consumption data may include information related to amounts of power being consumed by each local component 20 and each other component 20 while operating under various load conditions, operating parameters, or the like.

At block 304, the cloud-computing device 274 may compare productivity data between the first set of data and the second set of data. The productivity data may include a number of units produced by the respective factory 12, a speed at which certain components 20 may operate, or the like. At block 306, the cloud-computing device 274 may compare maintenance data between the first and second sets of data. The maintenance data may include a list of various maintenance operations that may have been performed on the respective component 20. In one embodiment, the cloud-computing device 274 may cross reference the identified patterns in the first and second sets of data with the maintenance records for each component associated with the identified pattern. In certain cases, some patterns of data may commonly be associated with a specific maintenance event. For instance, if a pattern of increased energy consumption is identified in the second set of data and is followed by a maintenance event, such as replacing some part within a respective component 20, the cloud-computing device 274 may provide a recommendation to replace the same part of the local component 20 when the energy consumption data of the local component 20 exhibits a similar energy consumption pattern.

In addition to or in lieu of comparing the first set of data and the second set of data, at block 288, the cloud-computing device 274 may derive or predict the behavior of a component 20 that may not be related to the data being analyzed. For example, the cloud-computing device 274 may receive a first set of data related to the temperature of a component 20 operating in a particular cell 18. Using the first set of data related to temperature, the cloud-computing device 274 may derive or determine a characteristic of the respective component 20 other than temperature. By way of example, the cloud-computing device 274 may determine power characteristics of the respective component based on the temperature data. In another example, the cloud-computing device 274 may use power data to infer data related to production. As such, the cloud-computing device 274 may use one type of data to infer different types of data related to the respective component 20, the respective cell 18, the respective area 16, the respective factory 12, and the like.

Alternatively, the cloud-computing device 274 may use one type of data to infer different types of data related to a different component 20, a different cell 18, a different area 16, a different factory 14, and the like. For example, the cloud-computing device 274 may receive power data related to a first component 20. Using the power data for the first component 20, the cloud-computing device 274 may derive or infer temperature data for a second component 20, which may be coupled to or affected by the operations of the first component 20. In this manner, the cloud-computing device 274 may use one type of data associated with one component 20 to determine another type of data associated with another component 20. In one embodiment, the cloud-computing device 274 may determine how the two components 20 may relate with each other based on the effectual relationship between the two components 20, the hierarchical levels in which the two components 20 operate, and the like.

Keeping the foregoing in mind and referring back to FIG. 19, at block 290, the cloud-computing device 274 may determine operation adjustments for the local components 20 in the local factory 12 based on the analyses performed at block 288. The cloud-computing device 274 may then, at block 292, send one or more commands to the local industrial control system 22 to adjust the operations of the local components 20 communicatively coupled to the local control system 22 to operate more efficiently, produce more effectively, conserve energy, or the like. For instance, if the cloud-computing device 274 identifies a pattern of data in other components 20 that was subsequently followed by implementing an operational change to the other components 20, the cloud-computing device 274 may send commands to the local industrial control system 22 to make the same operational changes to the similar local components 20. In this way, the cloud-computing device 274 may assume that the operator of the local industrial control system 22 may wish to make the same operational changes as indicated by the pattern of data.

However, it should be noted that in other embodiments, the cloud-computing device 274, at block 292, may instead send a recommendation to the local industrial control system 22 (e.g., via GUI) indicating suggested operational changes. The recommendation may also include a data report that details the identified patterns associated with the other components 20 and the subsequent operational changes implemented with the other components 20. Additionally, the report may include analysis that may interpret the identified patterns as alarm conditions that may be used to determine how the corresponding components 20 may be maintained. In certain embodiments, the report may also indicate the results or effects of making the operational change. For example, the operational changes may lead to a decrease in energy consumption, thereby operating more efficiently with respect to the energy available to the components 20.

In addition to sending the recommendations and/or reports to the local industrial control system 22, the cloud-computing device 274 may also send information related to the identified patterns to a remote monitoring service, technicians associated with the local industrial automation system, technical support staff that may be capable of interpreting the identified patterns, expert troubleshooters, consultants associated with the local industrial control system, and the like. In this manner, the appropriate personnel may receive data related to the operations of the local industrial automation system immediately.

In one embodiment, the cloud-computing device 274 may observe that another industrial control system 22 may be operating similar components 20 under similar conditions as the local components 20. The other industrial control system 22 may be located at a different geographical location as the local industrial control system 22 but may be owned and operated by or associated with the same entity. As such, each of these industrial control systems 22 may be producing the same product even though they may be operating each respective component 20 slightly differently. In this case, the cloud-computing device 274 may analyze other data associated with the respective components 20 with respect to various hierarchical levels of the industrial automation system 10. The cloud-computing device 274 may then determine whether some of the components 20 or some of the hierarchical levels of the industrial automation system 10 may be operating more efficiently. The cloud-computing device 274 may then make operational adjustments or recommendations to the local industrial control system 22 based on the analysis between two similarly operating factories.

In addition to analyzing data related to similar components 20 owned and operated by or associated with the same entity, the data 276 may include data associated with sub-industrial automation systems located within the local factory 12, within the same enterprise of the user, within the same industry of the user, in any other industry, and the like. Here, the cloud-computing device 274 may send recommendations to the local industrial control system 22 based on a portion of the data 276 that includes information related to components 20 being operated using similar operating parameters as the local components 20.

In another embodiment, the cloud-computing device 274 may analyze the first and second sets of data to perform various types of prognostic analysis that may indicate whether certain maintenance procedures or quality checks should be performed on a local component 20 based on the operational history and the maintenance history of the local industrial control system 22. That is, the information collected via the second set of data may include information indicating the history of maintenances performed on various components 20 in the other factories 12. In this manner, the cloud-computing device 274 may analyze whether the local components 20 were operated under similar circumstances as compared to other components 20 and determine when a local component 20 disposed in the local factory 12 may be serviced or replaced based on the history of usage and maintenance of a similar component used in other factories 12.

In yet another embodiment, at block 292, the cloud-computing device 274 may send commands to the local industrial control system 22 to take actions to prevent various sections or the local components 20 of the local factory 12 from going offline. That is, the cloud-computing device 274 may analyze the first and/or second sets of data and determine whether the local industrial automation system 10 or the local factory 12 may be at risk of stopping production due to certain problems or potential problems in a particular section or component(s) 20 of the local factory 12. For example, if the cloud-computing device 274 determines that a particular section of the local factory 12 or one of the local components 20 may experience a fault or failure based on the similar patterns of data identified from other components 20, the cloud-computing device 274 may send commands to the local industrial control system 22 to alter the operations of the certain section or components 20 of the local factory 12 that may feed the problematic section to decrease the load on the problematic section and help prevent the fault or failure from occurring.

The cloud-computing device 274 may also analyze the first and second sets of data with respect to various hierarchical levels of the industrial automation system 10, as discussed above with respect to FIGS. 9-13. As such, the cloud-computing device 274 may alter the operations of local components 20 in a particular scope, section, or hierarchical level of the industrial automation system 10 based on the first and second sets of data collected regarding various hierarchical levels of the local industrial automation system and various hierarchical levels of other industrial automation systems. For example, the control system may receive data regarding the power equipment in the local factory 12 as well as data regarding the power equipment in other factories 12. Here, the cloud-computing device 274 may make decisions affecting the power equipment in the local factory 12 based on the data regarding the power equipment in the other factories 12.

In certain embodiments, the cloud-computing device 274 may evaluate the first and second sets of data regarding the power equipment with respect to various hierarchical levels in each respective industrial automation system 10. As such, the cloud-computing device 274 may make decisions affecting various hierarchical levels of the local factory 12 based on the data regarding the power equipment operating in other factories 12 with respect to the operations of the power equipment in various hierarchical levels of the factory 12. In the same manner, the cloud-computing device 274 may also evaluate the collected data with respect to a lower hierarchical level, such that the operations of the components in the lower hierarchical level may be adjusted according to various data analysis results regarding the power equipment data. As such, the cloud-computing device 274 may make various types of decisions that affect various hierarchical levels of the local industrial automation system 10.

When performing the various types of analyses at block 288, the cloud-computing device 274 may determine which hierarchical level of the industrial automation system 10 to analyze the received data based on various network factors. For instance, the availability of data pertaining to more aspects of the industrial automation system may also be used as a factor for determining the appropriate hierarchical level to analyze the first and second sets of data. For instance, if network latency, capacity, and utilization capabilities associated with the cloud-computing device 274 and the collected data are low, the cloud-computing device 274 may analyze the first and second sets of data with respect to higher and lower hierarchical levels of the industrial automation system 10. However, if, for example, the latency increases or becomes high, the cloud-computing device 274 may refrain from analyzing the available data associated with higher hierarchical levels since the processing time to analyze such data may not be effective to make real or near real-time operational adjustments. As such, the cloud-computing device 274 may analyze the first and second sets of data with respect to lower hierarchical levels and thus use data acquired from the components 20 or cells 18 when making its determinations.

Broadcasting Data and Data Tags

As industrial control system 22, the servers 272, or the cloud-computing device 274 acquires data from various parts of the industrial automation system 10, it is increasingly apparent that the industrial control system 22, the servers 272, or the cloud-computing device 274 may have access to a voluminous amount of data without an efficient manner in which to organize or sort through the data. That is, since each industrial automation component 20 may provide data with respect to the cell 18, the area 16, the factory 12, and the like, the control system 22 or any other data processing component (e.g., servers 272, cloud-computing device 274) may have difficulties sorting through all of the available data for analysis, monitoring, and the like. As such, given the sheer volume of data that may be collected from the awareness-enabled industrial automation control system 10, it may be beneficial to incorporate a protocol or classification system that may assist the control system 22 to identify and/or classify the data that it may have acquired more effectively. After the control system 22 classifies or categorizes the acquired data, it may be beneficial for the control system 22 or any other data processing component to broadcast the data along with the respective categorization to a data feed, in which other industrial automation components 20 may be able to track and review.

Keeping the foregoing in mind, FIG. 21 illustrates a flow chart of a method 310 for broadcasting data and data tags in the industrial automation system 10. As mentioned above, each industrial control component 22 may receive data from various sources within the industrial automation system 10. In addition to data from different sources, the received data may be contextualized with respect to the various hierarchical levels discussed above (e.g., component-level, cell-level, area-level, factory-level, etc.). In this manner, the data acquired by the control component 22 may be characterized in a number of different ways. For instance, the data may be characterized according to the type (e.g., energy, communications, connectivity, processing power, etc.) of data it may be, the device (e.g., industrial automation component 20) that may have sent the data, the hierarchical level that corresponds to the data, and the like. Keeping this in mind, the method 310 provides a manner in which the data received by a respective control component 22 may broadcast messages or notifications in a message feed or data feed channel, such that other control components 22 may observe or become aware of the data received by the respective control component 22.

Referring now to FIG. 21, the description of the method 310 presented below will be discussed as being performed by the control component 22. However, it should be noted that the method and techniques presented herein may be performed by any data processing component, such as the servers 272 and the cloud-computing device 274.

By way of example, at block 312, the control component 22 may receive data from one or more industrial automation components 20. As discussed above, the data may be associated with a particular component 20, a group of components 20, a hierarchical level, or the like. In one embodiment, the associations related to the data may be stored within the metadata of the respective data. That is, the metadata may include information that indicates how the various relationships or associations may pertain to the respective data.

Keeping this in mind, at block 314, the control component 22 may determine whether the data is associated with an existing data tag or data categorization. The data tag may define an association or a data category that may correspond to the respective data. In certain embodiments, the data tags may be pre-defined by users of the industrial automation components 20, defined by an application programmer (e.g. application programmer-defined tags) of an industrial control system 22, automatically generated by the control system (e.g., system-defined tags), and the like. That is, in some instances, a user may specify that a particular type of data may be categorized with a particular data tag. The data tag specification may be stored in the metadata of the respective data, and thus may be part of the respective data as the respective data is transmitted and stored. In some embodiments, the metadata of the respective data may track the industrial automation components 20 that the respective data may have been stored. That is, the metadata may store a history of the components 20 in which it may have been previous stored on or transferred to.

In one embodiment, the control system may add a tag or information to metadata of the collected data that may be used to assist the control system in categorizing the collected data into one or more searchable categories. The categorization of the collected data may enable the control system to identify additional data that may be relevant to a certain set of data being analyzed by the control system.

If the data is associated with or has an existing data tag stored in its respective metadata, the control component 22 may proceed to block 320 and broadcast or display the data along with the data tag in a data feed channel. The data feed channel may be implemented using an application programming interface (API) such as the Representational State Transfer (REST) architecture, which is a collection of network design principles that define resources and ways to address and access data. As such, the data feed channel may interface with and may be accessed by various web syndication formats like Really Simple Syndication (RSS) and Atom Syndication Format (Atom).

The data feed channel may include a family of standard web (e.g., Internet-based) feed formats that may publish information that may be updated multiple times. As such, the data feed channel may be a Rich Site Summary (RSS) document (e.g., feed, web feed, or channel) that may be depicted on a display of the control component 22 or may be accessible by other components 20 or other control systems 22. The RSS document may include information related to the data and the data tag mentioned above including full or summarized text, publishing date, publisher's component identification number, and the like. In certain embodiments, the RSS document may include a standard Extensible Markup Language (XML) file format that ensures compatibility with many different machines/programs. As such, by using the RSS document, the control system 22 may syndicate data automatically, such that other components 20 or control systems 22 may be automatically updated of a status pertaining to the respective component 20 or respective control system 22 publishing the respective data.

Keeping the foregoing in mind, in one embodiment, the data feed channel may be associated with certain levels within the hierarchical levels of the industrial automation system 10. For example, the data feed channel may be associated with a particular component 20, cell 18, area 16, factory 14, or the like of the hierarchical levels of the industrial automation system 10. In this case, the data, data tags, and other information may be published in a respective data feed channel that corresponds with the data, data tags, or other information. In certain embodiments, different control systems 22, components 20, or users may then subscribe or request access to a respective data feed channel and may thus be aware of all of the data, data tags, etc. that may be related to the respective hierarchical level of the industrial automation system 10. Although the data feed channel has been described with respect to a particular component 20, cell 18, area 16, factory 14, or the like of the hierarchical levels of the industrial automation system 10, it should be noted that the data feed channel may correspond to a particular industry. As such, all of the data, data tags, etc. associated with the particular industry may be published on one data feed channel associated with the particular industry. Moreover, various control systems 22 may subscribe to one or more data feed channels associated with one or more respective component 20, cell 18, area 16, factory 14, industry, or the like. In one embodiment, when the data feed channel is associated with a particular component 20, cell 18, area 16, factory 14, or industry, the data feed channel may be managed and/or operated by the cloud-computing device 274. As such, the cloud-computing device 274 may perform the method 310 described above. However, it should be noted that the techniques described herein may be performed by a control system 22, the servers 272, or the like.

FIG. 22 illustrates an example block diagram 330 of a data feed channel 332 that may be output using the method 310 described above. As shown in FIG. 22, the data feed channel 322 may publish data received by a control system 22 that may receive data associated with the buffering conveyor section 62 and the sterilization station 64 of the packaging factory 50 in FIG. 4. The data feed channel 332 may publish messages or entries that may describe the data being published. For example, entry 334 may publish that the buffering conveyor section 62 consumed 500 watts of energy per hour, which may be the data received by the respective control system 22. The data tags associated with the consumed energy may include the type of data being published (e.g., energy) and the hierarchal level that corresponds to the data (e.g., cell 4). In certain embodiments, the data tag may be distinguished from the data using a symbol, such as "#" and the like.

In addition to the data and the data tag, the entries 334, 336 may include a date and/or time at which the data was published, identification information related to the control system 22 or component 20 that published the data, a hierarchical-level associated with the publisher, a physical location of the publisher, and the like. In certain embodiments, the entries 334, 336 may be presented such that the most recently published data may be atop of the data feed channel. However, the entries 334, 336 may also be presented such that the most recently published data may be on the bottom of the data feed channel depending on the preference of the subscriber, the respective control system 22, the user of the respective control system 22, or the like. Further, a subscriber of the data feed channel 332 may scroll or search through all of the entries of the data feed channel 332 to locate older entries.

Referring now back to block 314, if the data received by the control system 22 is not associated with a data tag, the control system 22 may proceed to block 316. At block 316, the control system 22 may send a request to another control system 22, the servers 272, the cloud-computing device 274, or the like to identify a data tag that may be associated with the received data. In certain embodiments, the other device may query a database or its local data and identify data that may be similar to the data received by the respective control system 22 at block 312. Upon locating the similar data, the other device may determine whether the similar data includes a data tag within its metadata that may define the type of data. If the other device determines a data tag that may be associated with the data received at block 312, the other device may send the determined data tag to the respective control system 22. As such, at block 318, if the control system 22 receives the data tag for the respective data, the control system 22 may proceed to block 320 and broadcast or publish the data along with the corresponding data tag. If however, at block 318, the control system 22 does not receive the data tag, the control system 22 may return to block 312 and continue receiving data from various industrial automation components 20.

In certain embodiments, the control system 22 may publish the data using a normalized unit that may have been specified by a user of the control system 22, an application programmer of the control system 22, or the like. When various control systems 22 receive data from other data feed channels, the respective control system 22 may convert the data to a unit as specified by the respective user, programmer, or the like.

In addition to or in lieu of sending the request for a data tag to other devices, in one embodiment, the control system 22 may review various data feed channels that the respective control system 22 may subscribe to and identify a data tag that may be associated with the data received at block 312. That is, the respective control system 22 may search the data feeds that may be available to the respective control system 22 and identify published data that may be similar to the data received at block 312. Upon locating these entries in the data feed channel, the respective control system 22 may identify the data tags used to characterize the published data. The respective control system 22 may then use the identified data tags to broadcast the received data at block 320.

FIG. 23 illustrates a flow chart of a method 340 for enabling a remote control system 22 to subscribe to a data feed channel of a particular control system 22. As shown in FIG. 23, at block 342, the particular control system 22 may receive a request to subscribe to a data feed channel associated with the particular control system 22 from a remote or other control system 22 in the industrial automation system 10.

At block 344, the particular control system 22 may verify whether the requesting control system 22 is authorized to access the respective data feed channel. That is, the particular control system 22 may include a list of components 20 or other control systems 22 that may be authorized to have access to the respective data feed channel. In this case, if the requesting control system 22 is not listed as an authorized entity, the particular control system 22 may deny the request to allow the other control system 22 to subscribe to the respective data feed channel.

At block 346, the particular control system 22 may provide the requesting control system 22 access to the respective data feed channel. As such, the remote control system 22 may monitor the data and data tags published by the particular control system 22. In certain embodiments, instead of a data feed channel, the particular control system 22 may send electronic mail messages, text messages (e.g., Short Message Service (SMS)), or other electronic forms of communication (e.g., updating an RSS document) to the remote control system 22 to inform the remote control system 22 of the data and data tags received by the particular control system 22.

In certain embodiments, each control system 22 may operate a respective data feed channel. In this case, when a respective control system 22 provides a requesting control system 22 access to the respective data feed channel, the respective control system that may publish the information of the respective data feed channel in the data feed channel of the requesting control system 22. In this manner, the requesting control system 22 may monitor the data feed channels of a number of control systems 22 that provided the requesting control system 22 access to their respective data feed channels. As a result, the requesting control system 22 may monitor or be aware of the data associated with a number of other control systems 22.

By publishing data and data tags received by the particular control system 22 and by providing other control systems with access to the data feed channel of the particular control system 22, the particular control system 22 may enable itself and other control systems 22 to sort through data more efficiently. For example, any control system 22 having access to the data feed channel may sort through the published data using a method shown in FIG. 24.

FIG. 24 illustrates a flow chart of a method 350 for organizing data published in a data feed channel. The method 350 may be performed by any control system 22 that may have access to the data feed channel. At block 352, the control system 22 may receive a request to display all similarly tagged data published in a particular data feed channel. That is, the control system 22 may have access to a number of different data feed channels that may be associated with a number of different control systems 22. As such, the requesting control system 22 may specify a particular data feed channel in which the data is being organized. In certain embodiments, the requesting control system 22 may specify a number of different data feed channels to identify data having similar data tags.

At block 354, the control system 22 may search each specified data feed channel for data tags and generate a list of entries published by the respective data feed channel having the same data tag. In one embodiment, the data tag may be denoted by a special character or symbol, thereby enabling the control system 22 to locate the data tags more efficiently.

Upon identifying the data having the similar data tags, the control system 22 may display the identified data at block 356. In one embodiment, the identified data may be displayed in groups according to the respective data tag. It should be noted that the respective data feed channel being queried may not change its presentation at this time. Instead, a new data feed channel or visualization having the identified data may be presented. As such, each respective data feed channel being queried may continue to broadcast or publish data in real time.

Keeping the foregoing in mind, the control system 22, the servers 272, the cloud-computing devices 274, or the like may use the data and data tags published in the data channel feeds to control the operations of the industrial automation system 10. In certain embodiments, the control system 22, the servers 272, the cloud-computing devices 274, or the like identify patterns in the published data as per the method 280 described above in FIG. 19.

In the same manner, FIG. 25 illustrates a flow chart of a method 350 for analyzing data that may be broadcast or published in the data feed channel. In certain embodiments, the method 360 may occur after the method 350 has been performed. Keeping this in mind and referring to FIG. 25, at block 362, the control system 22 may receive data identified in one or more data feed channels having similar data tags.

At block 364, the control system 22 may analyze the data received at block 352. In certain embodiments, the data may be analyzed using various techniques described herein. For example, the received data may be analyzed to identify patterns, which may then be used to predict the behavior of the components 20, the cells 18, the areas 16, the factories 14, and the like associated with the received data. In one embodiment, the data may be analyzed or compared to a threshold. In certain embodiments, the data analyzed at block 364 may include data from various different data channels. That is, the data may include data from all of the control systems 22 that the respective control system 22 may be subscribed to.

Additionally, the control system 22 may analyze the data by cross-referencing entries of the respective data feed channel (or along with other data feed channels) with historical data associated with a number of other industrial automation components. The control system 22 may also determine whether various relationships exist between the entries. Using these types of analyses, the control system 22 may predict or determine an expected behavior of various components in the respective industrial automation system 10.

At block 366, the control system 22 may send a recommendation to one of the control systems 22 in the industrial automation system 10 based on the analysis. That is, the control system 22 may send a recommendation to alter the operations of an industrial automation component 20 that corresponds to the respective control system 22 based on the predicted behavior, the threshold, and the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An industrial automation control system configured to:
receive data associated with at least one component within an industrial automation system;
receive input regarding at least one of a plurality of data tags and a hierarchical level of a plurality of hierarchical levels, wherein the at least one of the plurality of data tags describes at least one data characteristic, wherein each of the plurality of hierarchical levels is associated with a different scope of the industrial automation system;
determine whether the data is associated with the at least one of the plurality of data tags and the hierarchical level; and
broadcast the data, the hierarchical level, and the at least one of the plurality of data tags in a data feed channel based on determining the data is associated with the at least one of the plurality of data tags and the hierarchical level, wherein the data feed channel comprises a Rich Site Summary (RSS) document that is accessible by a plurality of other industrial automation control systems.
2. The industrial automation control system of claim 1, wherein the plurality of hierarchical levels comprises one or more component-levels, wherein each component-level is associated with at least one industrial automation component in the industrial automation system, one or more cell-levels comprising at least one of the component-levels, one or more area-levels comprising at least one of the cell-levels, and a factory-level comprising the component-levels, the cells-levels, and the area-levels.

3. The industrial automation control system of claim 1, wherein the at least one of the plurality of data tags comprises a type of the data.

4. The industrial automation control system of claim 1, wherein the at least one of the plurality of data tags is stored in a metadata of the data.

5. The industrial automation control system of claim 1, wherein the plurality of other industrial automation control systems subscribe to the data feed channel.

6. The industrial automation control system of claim 1, wherein the data or the at least one of the plurality of data tags of the data feed channel is published to a plurality of other data feed channels associated with the plurality of other industrial automation control systems.

7. The industrial automation control system of claim 1, wherein the plurality of data tags are pre-defined by one or more users of the industrial automation control system, one or more application programmers of the industrial automation control system, generated by the industrial automation control system, or any combination thereof.

8. The industrial automation control system of claim 1, wherein the industrial automation control system is configured to broadcast an identity of a respective industrial control system broadcasting the data and the at least one of the plurality of data tags, a location of the respective industrial control system, or both.

9. The industrial automation system of claim 1, wherein when the industrial automation control system determines that the data is not associated with the at least one of the plurality of data tags, the industrial automation system is configured to:
search a second data feed channel to which the industrial automation system is subscribed for the at least one of the plurality of data tags; and
associate with data with the at least one of the plurality of data tags.

10. A controller, configured to:
receive, from at least one of a plurality of controllers, a request to subscribe to a first data feed channel associated with the controller, the request comprising:
one hierarchical level of a plurality of hierarchical levels of an automation system; and
at least one data tag of a plurality of data tags configured to characterize each entry of a plurality of entries of the first data feed channel;
determine whether the at least one of the plurality of controllers has an authorization to access the first data feed channel; and
publish a portion of the plurality of entries in a second data feed channel associated with the at least one of the plurality of controllers when the at least one of the plurality of controllers has the authorization, wherein the portion of the plurality of entries is associated with the one hierarchical level and the at least one data tag, and wherein the second data feed channel comprises a Rich Site Summary (RSS) document configured to display the portion of the plurality of entries and an additional plurality of entries associated with one or more operations of the at least one of the plurality of controllers, wherein the RSS document is scrollable to review each entry of the portion of the plurality of entries.

11. The controller of claim 10, wherein the controller is configured to determine whether the at least one of the plurality of controllers has the authorization based on a list of one or more industrial automation components, a list of one or more industrial control systems, or any combination thereof.

12. The controller of claim 10, wherein the controller is configured to provide the at least one of the plurality of controllers access to the first data feed channel by sending one or more electronic mail messages, sending one or more Short Message Service (SMS) messages, updating one or more Rich Site Summary (RSS) documents, or any combination thereof.

13. The controller of claim 10, wherein the plurality of entries comprises power consumption data of the industrial automation component.

14. The controller of claim 10, wherein the plurality of entries comprises production data associated with the industrial automation component.

* * * * *